(12) United States Patent
Warner et al.

(10) Patent No.: US 11,528,331 B2
(45) Date of Patent: Dec. 13, 2022

(54) MANAGEMENT SYSTEM FOR VCORES

(71) Applicant: ARRIS Enterprises LLC, Suwanee, GA (US)

(72) Inventors: Shawn Warner, Pepperell, MA (US); John F. Keisling, East Hampstead, NH (US); Kyoo Lee, Andover, MA (US); Santhana Chari, Johns Creek, GA (US); David E. Virag, Johns Creek, GA (US); Mircea Orban, Toronto (CA); Timothy M. Tierney, Pepperell, MA (US); Stephen Heckman, Newbury, MA (US); Tarkesh R. Mahajan, Westford, MA (US)

(73) Assignee: ARRIS Enterprises LLC, Suwanee, GA (US)

( * ) Notice: Subject to any disclaimer, the term of this patent is extended or adjusted under 35 U.S.C. 154(b) by 5 days.

(21) Appl. No.: 17/224,791

(22) Filed: Apr. 7, 2021

(65) Prior Publication Data

US 2022/0070277 A1    Mar. 3, 2022

Related U.S. Application Data

(60) Provisional application No. 63/071,967, filed on Aug. 29, 2020, provisional application No. 63/071,953, filed on Aug. 28, 2020, provisional application No. 63/071,892, filed on Aug. 28, 2020.

(51) Int. Cl.
*H04L 67/00* (2022.01)
*G06F 8/65* (2018.01)
*G06F 8/71* (2018.01)
*H04L 61/5014* (2022.01)
*H04L 61/5076* (2022.01)

(52) U.S. Cl.
CPC ............... *H04L 67/34* (2013.01); *G06F 8/65* (2013.01); *G06F 8/71* (2013.01); *H04L 61/5014* (2022.05); *H04L 61/5076* (2022.05)

(58) Field of Classification Search
CPC ....... H04L 67/34; H04L 61/5014; G06F 8/65; G06F 8/71
See application file for complete search history.

(56) References Cited

U.S. PATENT DOCUMENTS 11,042,366 B2 * 6/2021 Gibbs ................ G06F 9/45558
11,243,758 B2 * 2/2022 Mamgain ................ G06F 8/65
(Continued)

OTHER PUBLICATIONS

Brogi et al., "DockerFinder: Multi-attribute Search of Docker Images", 2017 IEEE International Conference on Cloud Engineering, Apr. 2017, IEEE Publishing.*
(Continued)

*Primary Examiner* — Todd L Barker
(74) *Attorney, Agent, or Firm* — Chernoff, Vilhauer, McClung & Stenzel, LLP

(57) ABSTRACT

In one embodiment, a head end is connected to a plurality of customer devices through a transmission network includes a remote fiber node that converts received data to analog data suitable to be provided on a coaxial cable for the plurality of customer devices. The head end includes vCore instantiated on one of the servers of the head end configured to provide services to the plurality of customer devices through the transmission network.

13 Claims, 21 Drawing Sheets

(56) References Cited

U.S. PATENT DOCUMENTS

| | | | |
|---|---|---|---|
| 2004/0015946 A1* | 1/2004 | Te'eni | G06F 8/61 717/169 |
| 2006/0041883 A1* | 2/2006 | Chambers, Jr. | G06F 9/4411 717/174 |
| 2007/0061803 A1* | 3/2007 | Barrett | G06F 11/0748 717/174 |
| 2007/0174362 A1* | 7/2007 | Pham | G06F 21/6209 |
| 2008/0072219 A1 | 3/2008 | Kabadiyski | |
| 2011/0296254 A1* | 12/2011 | Kemper | G06F 8/36 714/49 |
| 2016/0026816 A1* | 1/2016 | Peterson | G06F 21/6218 713/193 |
| 2017/0034023 A1* | 2/2017 | Nickolov | H04L 43/0817 |
| 2017/0264684 A1* | 9/2017 | Spillane | G06F 9/45558 |
| 2019/0095289 A1* | 3/2019 | Kumar | G06F 11/1461 |
| 2019/0207823 A1* | 7/2019 | Isci | H04L 41/5019 |
| 2020/0097183 A1* | 3/2020 | Rawal | G06F 3/0613 |
| 2021/0373878 A1* | 12/2021 | Padmanabhan | G06F 16/907 |

OTHER PUBLICATIONS

Yigitoglu et al., "Foggy: A Framework for Continuous Automated IoT Application Deployment in Fog Computing", 2017 IEEE International Conference on AI and Mobile Service (AIMS), Jun. 2017, IEEE Publishing.*

Zheng et al., "Wharf:Shariong docker Images in a Distributed File system", SoCC 2018 Proceedings of the ACM Symposium on Cloud Computing, Oct. 2018, ACM Publishing.*

Jaramillo et al., "Leveraging microservices architecture by using Docker Technology", SoutheastCon 2016, Mar. 2016, IEEE Publishing.*

Balalaie et al., "Microservices Architecture Enables DevOps:Migration to a Cloud-Native Architecture", May 2016, IEEE Software, IEEE Publishing.*

Invitation to Pay Additional Fees Re: Application No. PCT/US2021/026261, dated Jul. 19, 2021.

International Search Report and Written Opinion Re: Application No. PCT/US2021/026261, dated Sep. 9, 2021.

* cited by examiner

MANAGEMENT SYSTEM FOR VCORES

CROSS REFERENCE TO RELATED APPLICATIONS

This application claims the benefit of U.S. Provisional Patent Application Ser. No. 63/071,967 filed Aug. 29, 2020; claims the benefit of U.S. Provisional Patent Application Ser. No. 63/071,892 filed Aug. 28, 2020; and claims the benefit of U.S. Provisional Patent Application Ser. No. 63/071,953 filed Aug. 28, 2020.

BACKGROUND

The subject matter of this application relates to a management system for vCores.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to an Integrated CMTS (e.g., Integrated Converged Cable Access Platform (CCAP))—video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MAC PHY relocates both the MAC and the PHY to the network's nodes). Thus, while the core in the CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
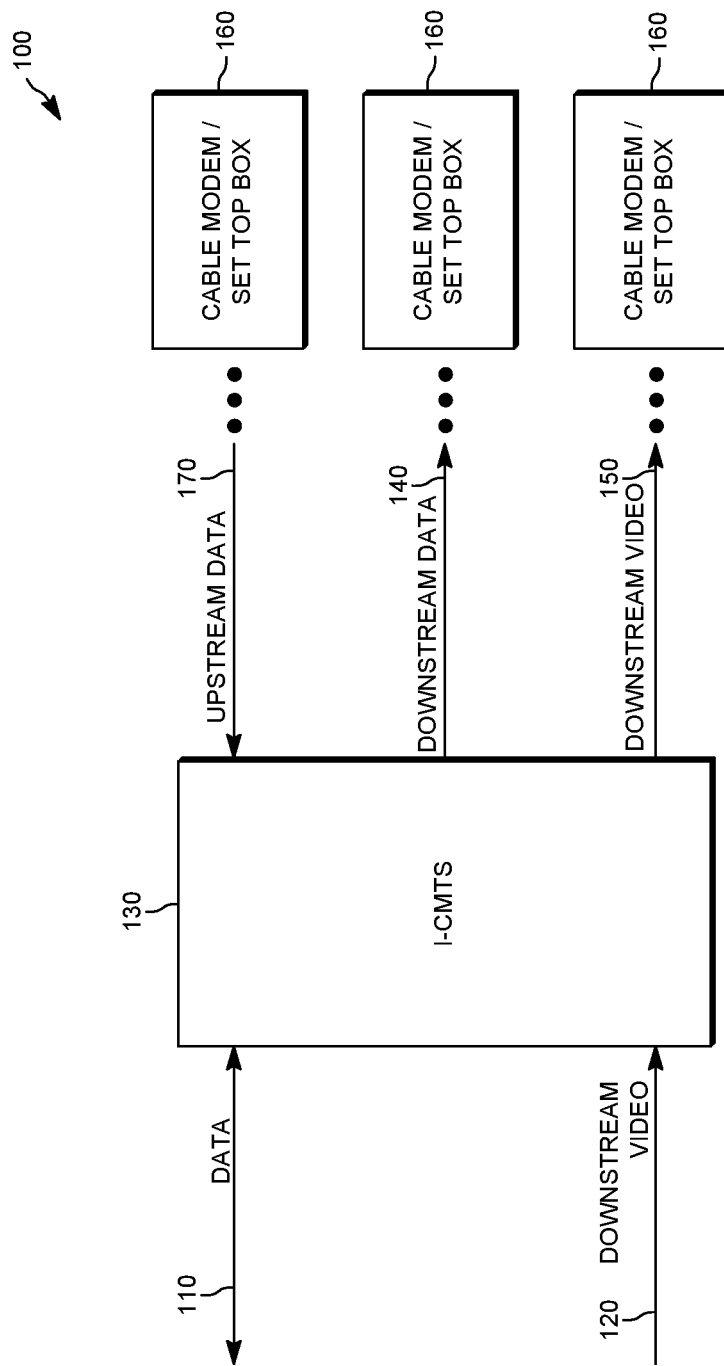
FIG. 1 illustrates an integrated Cable Modem Termination System.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
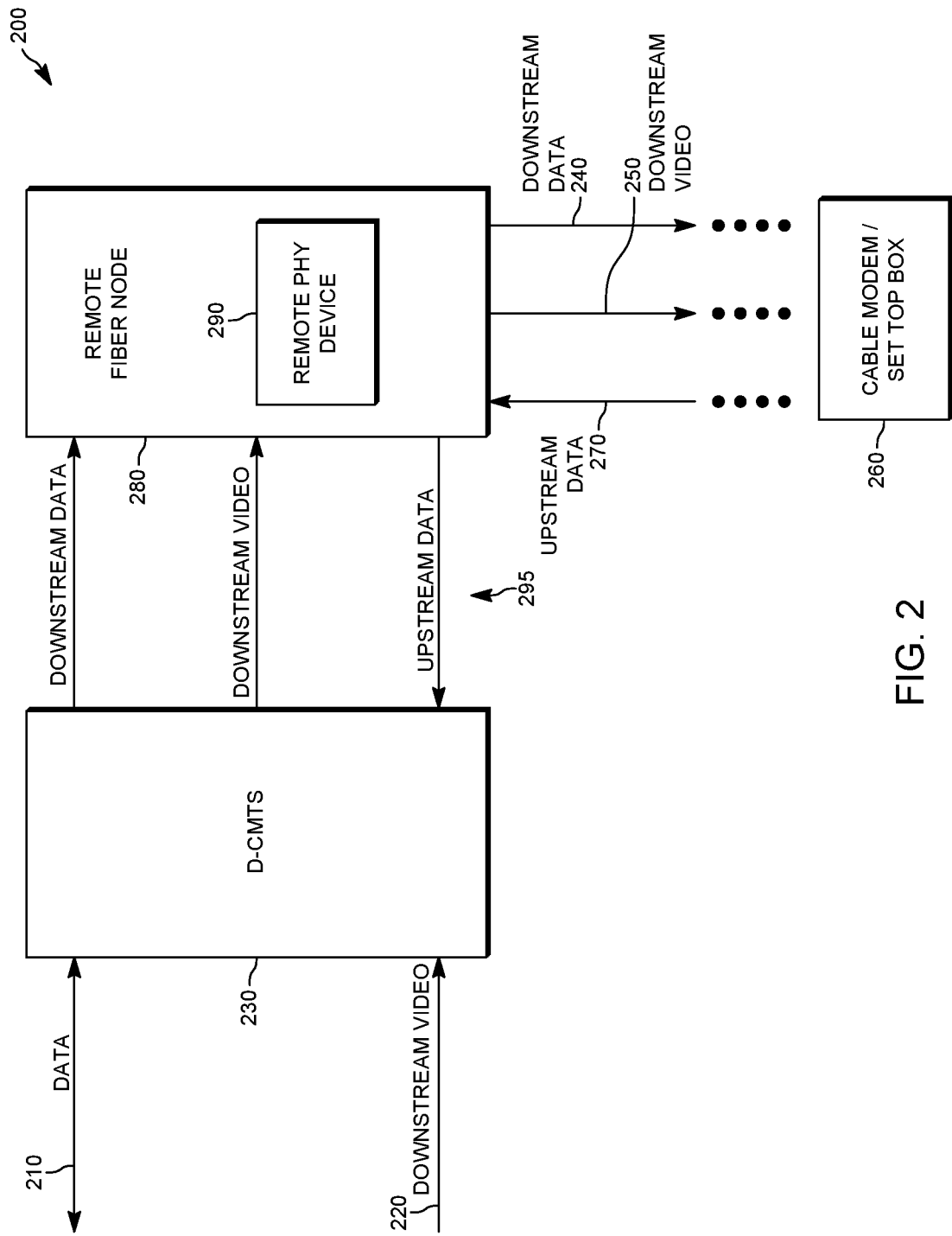
FIG. 2 illustrates a distributed Cable Modem Termination System.

Referring to FIG. 2, as a result of increasing bandwidth demands, limited facility space for integrated CMTSs, and power consumption considerations, it is desirable to include a Distributed Cable Modem Termination System (D-CMTS) 200 (e.g., Distributed Converged Cable Access Platform (CCAP)). In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general, the R-PHY often includes the PHY layers of a portion of the system. The D-CMTS 200 may include a D-CMTS 230 (e.g., core) that includes data 210 that is sent and received over the Internet (or other network) typically in the form of packetized data. The D-CMTS 200 may also receive downstream video 220, typically in the form of packetized data from an operator video aggregation system. The D-CMTS 230 receives and processes the received data 210 and downstream video 220. A remote Fiber node 280 preferably include a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with pseudowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230. In some cases, the remote PHY and/or remote MAC PHY functionality may be provided at the head end.

By way of example, the remote PHY device 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or analog optics. By way of example, the remote PHY device 290 may convert upstream DOCSIS, and out of band signals received from an analog medium, such as RF or linear optics, to digital for transmission to the D-CMTS 230. As it may be observed, depending on the particular configuration, the R-PHY may move all or a portion of the DOCSIS MAC and/or PHY layers down to the fiber node.

I-CMTS devices are typically custom built hardware devices that consist of a single chassis that include a series of slots, each of which receives a respective line card with a processor, memory, and other computing and networking functions supported thereon. Each of the line cards include the same hardware configuration, processing capabilities, and software. Each of the line cards performs the functions of the I-CMTS device, including the MAC and PHY functionality. As the system increasingly scales to support additional customers, additional line cards are included with the system to expand the processing capability of the system. Unfortunately, it is problematic to dynamically scale the number of line cards in a real-time manner to meet the demands of a particular network.

The computational power of microprocessor based commercial off the shelf (COTS) server platforms are increasing while the expense of such systems is decreasing over time. With such systems, a computing system may be, if desired, virtualized and operated using one or more COTS server, generally referred to herein as a virtual machine. Using container technologies running on the COTS server and/or virtual machine, the COTS server may operate with only a single operating system. Each of the virtualized applications may then be isolated using software containers, such that the virtualized application may not see and are not aware of other virtualized applications operating on the same machine. Typically, each COTS server includes one or more Intel/AMD processors (or other processing devices) with associated memory and networking capabilities running an operating system software. Typically, the COTS servers include a framework and an operating system where user applications are run on such framework and the operating system is abstracted away from the actual operating system. Each virtual machine may be instantiated and operated as one or more software applications running on a COTS server. A plurality of software containers may be instantiated and operated on the same COTS server and/or the same virtual machine. A plurality of COTS servers is typically included in one or more data centers, each of which are in communication with one another. A plurality of COTS server may be located in different geographic areas to provide geo-redundancy. In some embodiments, the container may include the same functionality as a virtual machine, or vice versa. In some embodiments, a grouping of containerized components, generally referred to as a pod, may be in the form of a virtual machine.

In some embodiments, the COTS servers may be "bare metal" servers that typically include an operating system thereon together with drivers and a portion of a container orchestration system. One or more containers are then added to the "bare metal" server while being managed by the container orchestration system. The container orchestration system described herein may likewise perform as, and be referred to as, a virtual machine orchestration system, as desired. In some embodiments, "bare metal" servers may be used with pods running on the operating system thereon together with drivers and a container orchestration system. In some embodiments, virtual machines may be omitted from the COTS servers.

Selected software processes that are included on a line card and/or a remote PHY device may be run on a "bare metal" server and/or virtual machine, including software containers, running on a COTS server, including both "active" and "back-up" software processes. The functionality provided by such a "bare metal" server and/or virtual machine may include higher level functions such as for example, packet processing that includes routing Internet packet provisioning, layer 2 virtual private networking which operates over pseudowires, and multiprotocol label switching routing. The functionality provided by such a "bare metal" server and/or virtual machine may include DOC SIS functions such as for example, DOCSIS MAC and encapsulation, channel provisioning, service flow management, quality of service and rate limiting, scheduling, and encryption. The functionality provided by such a "bare metal" server and/or virtual machine may include video processing such as for example, EQAM and MPEG processing.

Each of the COTS servers and/or the virtual machines and/or software containers may contain different hardware profiles and/or frameworks. For example, each of the COTS servers and/or "bare metal" servers and/or virtual machines and/or software containers may execute on different processor types, different number of processing cores per processor, different amounts of memory for each processor type, different amounts of memory per processing core, different cryptographic capabilities, different amounts of available off-processor memory, different memory bandwidth (DDR) speeds, and varying types and capabilities of network interfaces, such as Ethernet cards. In this manner, different COTS servers and/or "bare metal" servers and/or virtual machines and/or software containers may have different processing capabilities that vary depending on the particular hardware. Each of the COTS servers and/or "bare metal" servers and/or the virtual machine and/or software containers may contain different software profiles. For example, each of the COTS servers and/or "bare metal" servers and/or virtual machines and/or software containers may include different software operating systems and/or other services running thereon, generally referred to herein as frameworks. In this manner, different COTS servers and/or "bare metal" servers and/or virtual machines and/or software containers may have different software processing capabilities that vary depending on the particular software profile.

Figure 3:
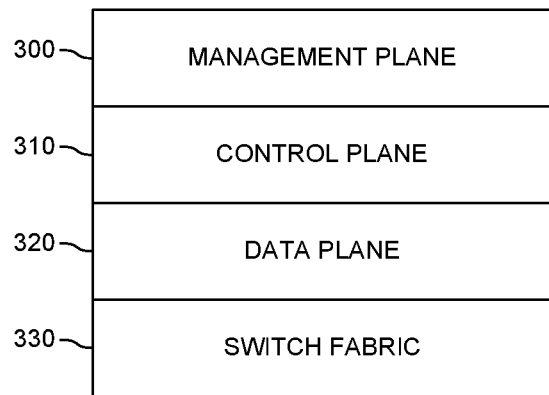
FIG. 3 illustrates a layered network processing stack.

Referring to FIG. 3, for data processing and for transferring data across a network, the architecture of the hardware and/or software may be configured in the form of a plurality of different planes, each of which performing a different set of functionality. In relevant part the layered architecture may include different planes such as a management plane 300, a control plane 310, a data plane 320, and switch fabric 330 to effectuate sending and receiving packets of data.

For example, the management plane 300 may be generally considered as the user interaction or otherwise the general software application being run. The management plane typically configures, monitors, and provides management, and configuration served to all layers of the network stack and other portions of the system.

For example, the control plane 310 is a component to a switching function that often includes system configuration, management, and exchange of routing table information and forwarding information. Typically, the exchange of routing table information is performed relatively infrequently. A route controller of the control plane 310 exchanges topology information with other switches and constructs a routing table based upon a routing protocol. The control plane may also create a forwarding table for a forwarding engine. In general, the control plane may be thought of as the layer that makes decisions about where traffic is sent. Since the control functions are not performed on each arriving individual packet, they tend not to have a strict speed constraint.

For example, the data plane 320 parses packet headers for switching, manages quality of service, filtering, medium access control, encapsulations, and/or queuing. As a general matter, the data plane carriers the data traffic, which may be substantial in the case of cable distribution networks. In general, the data plane may be thought of as the layer that primarily forwards traffic to the next hop along the path to the selected destination according to the control plane logic through the switch fabric. The data plane tends to have strict speed constraints since it is performing functions on each arriving individual packet.

For example, the switch fabric 330 provides a network topology to interconnect network nodes via one or more network switches.

As the system increasingly scales to support additional customers, additional COTS servers and/or "bare metal" servers and/or virtual machines and/or software containers are included with the system to expand the processing capability of the overall system. To provide processing redundancy, one or more additional COTS servers and/or "bare metal" servers and/or virtual machines and/or software containers may be included that are assigned as "back-up" which are exchanged for an "active" process upon detection of a failure event. The scaling of the data plane 320 on COTS servers and/or "bare metal" servers and/or virtual machines and/or software containers to service dynamically variable processing requirements should be performed in such a manner that ensures sufficiently fast processing of data packets and sufficient bandwidth for the transmission of the data packets to ensure they are not otherwise lost.

It is desirable to virtualize the data plane, and in particular a portion of the Remote PHY functionality on a COTS server and/or "bare metal" servers. In this manner, the MAC cores for the cable distribution system may run on COTS servers and/or "bare metal" servers. By way of reference herein, a virtualized Remote PHY MAC Core may be referred to herein as a vCore instance.

Figure 4:
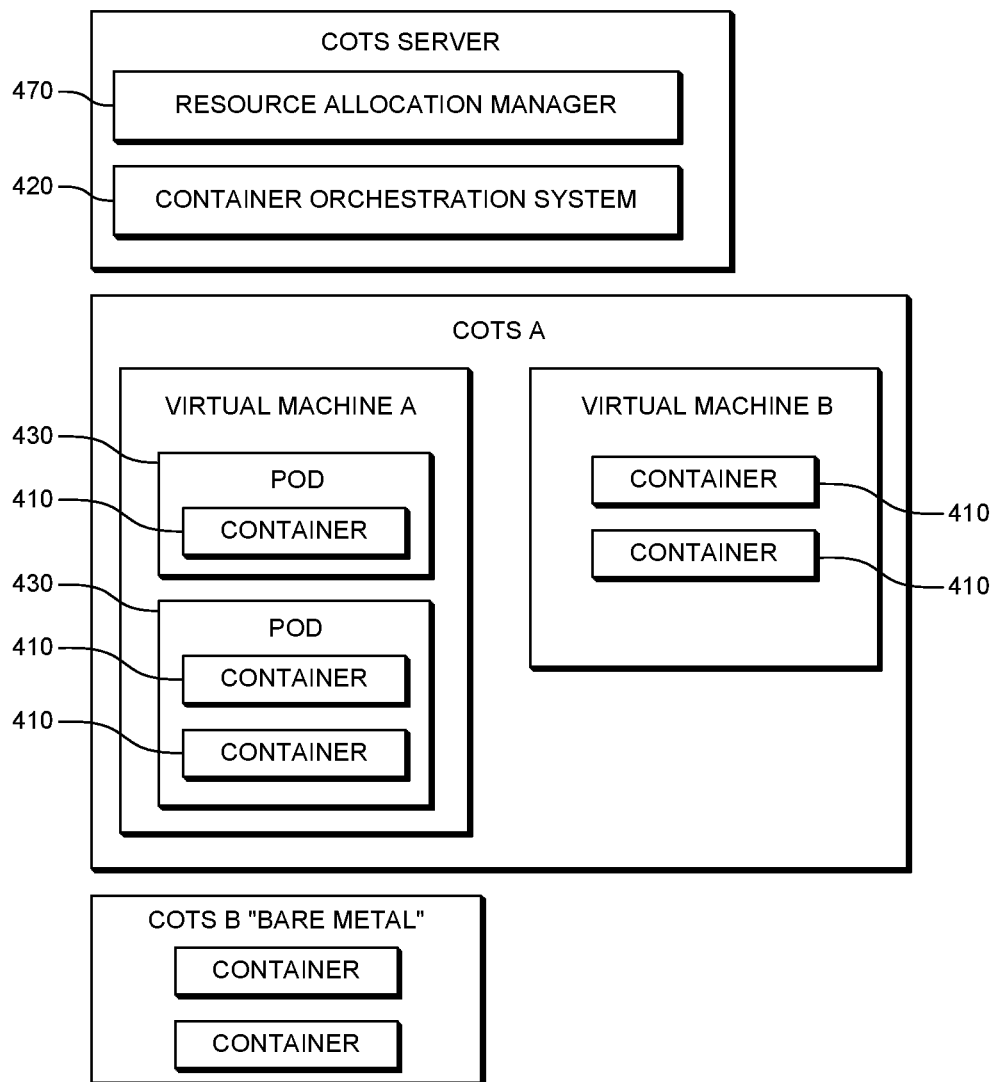
FIG. 4 illustrates a server system with a resource allocation manager and a container orchestration system.

Referring to FIG. 4, it is desirable to incorporate platform as a service that uses operating system level virtualization to deliver software in packages, generally referred to as containers 410. Each of the containers are isolated from one another and bundle their own software, libraries, and configuration files. The containers may communicate with one another using defined channels. As a general matter, one or more applications and its dependencies may be packed in a virtual container that can run on a COTS server and/or "bare metal" server and/or a virtual machine. This containerization increases the flexibility and portability on where the application may run, such as an on-premises COTS server, a "bare metal" server, a public cloud COTS server, a private cloud COTS server, or otherwise. With each container being relatively lightweight, a single COTS server and/or "bare metal" server and/or a virtual machine operating on a COTS server and/or "bare metal" server may run several containers simultaneously. In addition, the COTS server and/or "bare metal" server and/or the virtual machine and/or the containers may be distributed within the cable distribution system.

A COTS server and/or "bare metal" server and/or a virtual machine may include a container orchestration system 420 for automating the application deployment, scaling, and management of the containers 410 across one or more COTS servers and/or "bare metal" servers and/or virtual machines. Preferably the computing device running the container orchestration system 420 is separate from the computing device providing the containers for the dataplane applications. It is to be understood that the virtual machine illustrated in FIG. 4 may be omitted, such as the COTS B. The application deployment, scaling, and management of the containers may include clusters across multiple hosts, such as multiple COTS servers. The deployment, maintaining, and scaling, of the containers may be based upon characteristics of the underlying system capabilities, such as different processor types, different number of processing cores per processor, different amounts of memory for each processor type, different amounts of memory per processing core, different amounts of available off-processor memory, different memory bandwidth (DDR) speeds, different frameworks, and/or varying types and capabilities of network interfaces, such as Ethernet cards. Moreover, the container orchestration system 420 may allocate different amounts of the underlying system capabilities, such as particular processor types, a selected number of processors (e.g., 1 or more), a particular number of processing cores per selected processor, a selected amount of memory for each processor type, a selected amount of memory per processing core, a selected amount of available off-processor memory, a selected framework, and/or a selected amount and/or type of network interface(s), such as Ethernet cards. A corresponding agent for the container orchestration system 420 may be included on each COTS server (e.g., COTS A and/or COTS B).

The container orchestration system 420 may include a grouping of containerized components, generally referred to as a pod 430. A pod consists of one or more containers that are co-located on the same COTS server and/or "bare metal" server and/or the same virtual machine, which can share resources of the same COTS server and/or "bare metal" server and/or same virtual machine. Each pod 430 is preferably assigned a unique pod IP address within a cluster, which allows applications to use ports without the risk of conflicts. Within the pod 430, each of the containers may reference each other based upon a localhost or other addressing service, but a container within one pod preferably has no way of directly addressing another container within another pod, for that, it preferably uses the pod IP address or otherwise an addressing service.

A traditional D-CMTS RPHY Core may be implemented as a specialty built appliance including both software and hardware to achieve desired performance characteristics, such as ensuring the timing of the transfer of data packets. The specially built appliance is not amenable to automatic deployment nor automatic scaling due to the fixed nature of its characteristics. In contrast to a specially built appliance, the vCore instance is preferably implemented in software operating on a COTS server and/or "bare metal" server on top of an operating system, such as Linux. The vCore instance is preferably implemented in a manner that readily facilitates automation techniques such as lifecycle management, flexible scaling, health monitoring, telemetry, etc. Unfortunately, running a vCore instance on a COTS server and/or "bare metal" server tends to result in several challenges, mostly related to the data plane components. One of the principal challenges involves ensuring that data is provided to the network in a timely and effective manner to achieve the real time characteristics of a cable data distribution environment. The cable data distribution environment includes real time constraints on the timing of data packet delivery, which is not present in typical web-based environments or database environments.

Each vCore instance is preferably implemented within a container, where the size (e.g., scale, memory, CPU, allocation, etc.) of each container translates into the amount of server hardware and software resources assigned to the particular vCore instance. The amount of server hardware and software resources assigned to each particular vCore instance is preferably a function of the number of groups of customers (e.g., service groups) and/or number of customers that the vCore instance can readily provide RPHY MAC Core services to. For example, a limited amount of server hardware and software resources may be assigned to a particular vCore instance that has a limited number of groups of customers and/or customers. For example, a substantial amount of server hardware and software resources may be assigned to a particular vCore instance that has a substantial number of groups of customers and/or customers. For example, selected server hardware resources are preferably allocated among the different vCore instances in a non-overlapping manner so that each vCore instance has a dedicated and predictable amount of server hardware resources. For example, selected software resources are preferably allocated among the different vCore instances in a non-overlapping manner so that each vCore instance has a dedicated and predictable amount of software resources.

For example, the number of CPU cores preferably assigned to each vCore instance (Cc) may be a function of the total USSG (upstream service groups—groups of customer modems and/or set top boxes) (USsg) and the total DSSG (downstream service groups—groups of customer modems and/or set top boxes) (DSsg) connected through that vCore instance. This may be represented as vCore: $Cc=f_1$ (USsg, DSsg). Other hardware and/or software characteristics may likewise be assigned, as desired.

For example, the network capacity assigned to each vCore instance (Cbw) may be a function of the of the total USSG (upstream service groups—groups of customer modems and/or set top boxes) (USsg) and the total DSSG (downstream service groups—groups of customer modems and/or set top boxes) (DSsg) connected to that vCore instance. This may be represented as $Cbw=f_2$ (USsg, DSsg). Other hardware and/or software characteristics may likewise be assigned, as desired.

The scaling of the vCore instance may refer to the capability to automatically create and deploy a vCore instance within a container on a COTS server and/or "bare metal" server and/or virtual machine that is appropriately sized to serve a particular set of remote physical devices and/or service groups (e.g., sets of cable customers) and/or cable customers. The scaling of the vCore instance may also include, in some cases, the capability to automatically modify the hardware and/or software characteristics of an existing vCore instance within a container on a COTS server and/or "bare metal" server and/or virtual machine to be appropriately sized to serve a modified particular set of remote physical devices and/or service groups (e.g., sets of cable customers) and/or cable customers.

A resource allocation manager 470 may assign or reallocate a suitable amount of hardware and software of the COTS server and/or "bare metal" server resources to each particular vCore instance (e.g., CPU cores, and/or memory, and/or network capacity). The amount of such COTS server and/or "bare metal" server hardware and software resources assigned to or reallocate to each vCore instance may be a function of its scale and also other features, such as various other resource allocations. A corresponding agent for the resource allocation manager 470 may be included on each COTS server (e.g., COTS A, COTS B).

The vCore instance includes data plane software for the transfer of data packets and other functions of the data plane. The data plane software may include a set of data plane libraries and network interface controller (NIC) drivers that are used to manage the data packets for the data plane. Preferably, the data plane software operates in user space, as opposed to Kernel space like typical network processing software, thus it does not make use of the operating system kernel and container management network drivers and plugins. For example, the data plane software may include a queue manager, a buffer manager, a memory manager, and/or a packet framework for packet processing. The data plane software may use CPU cores that are isolated from the Kernel, meaning that the operating system scheduled processes are not running on these isolated CPU cores. The separation of the CPU cores between the data plane software and the operating system software ensures that tasks performed by the operating system software does not interfere with the data plane software processing the data packets in a timely manner. In addition, the separation of the CPU cores between the data plane software and the operating system software enables both to use the same physical central processing unit, albeit different cores, of the same physical central processing unit. In addition, other hardware and/or software capabilities may likewise be separated, such as for example, selected processors (e.g., 1 or more), particular number of processing cores per selected processor, selected amount of memory for each processor type, selected amount of memory per processing core, selected amount of available off-processor memory, selected framework, and/or selected amount and/or type of network interface(s).

It is also desirable for each vCore instance to have dedicated network bandwidth capability apart from other vCore instances and the operating system software. To provide dedicated network bandwidth for a vCore instance, the physical network interface cards may be virtualized so that a plurality of different software applications can make use of the same network interface card, each with a guaranteed amount of bandwidth available. The network interface cards are preferably virtualized using a single root input/output virtualization technique (SR-IOV). The SR-IOV partitions the NIC physical functions (e.g., PFs) into one or more virtual functions (VFs). The capabilities of the PFs and VFs are generally different. In general, the PF supports queues, descriptions, offloads, hardware lock, hardware link control, etc. In general, the VF supports networking features based upon queues and descriptors.

The automated creation, deployment, and removal of vCore instances may be performed by the container orchestration system 420.

Figure 5:
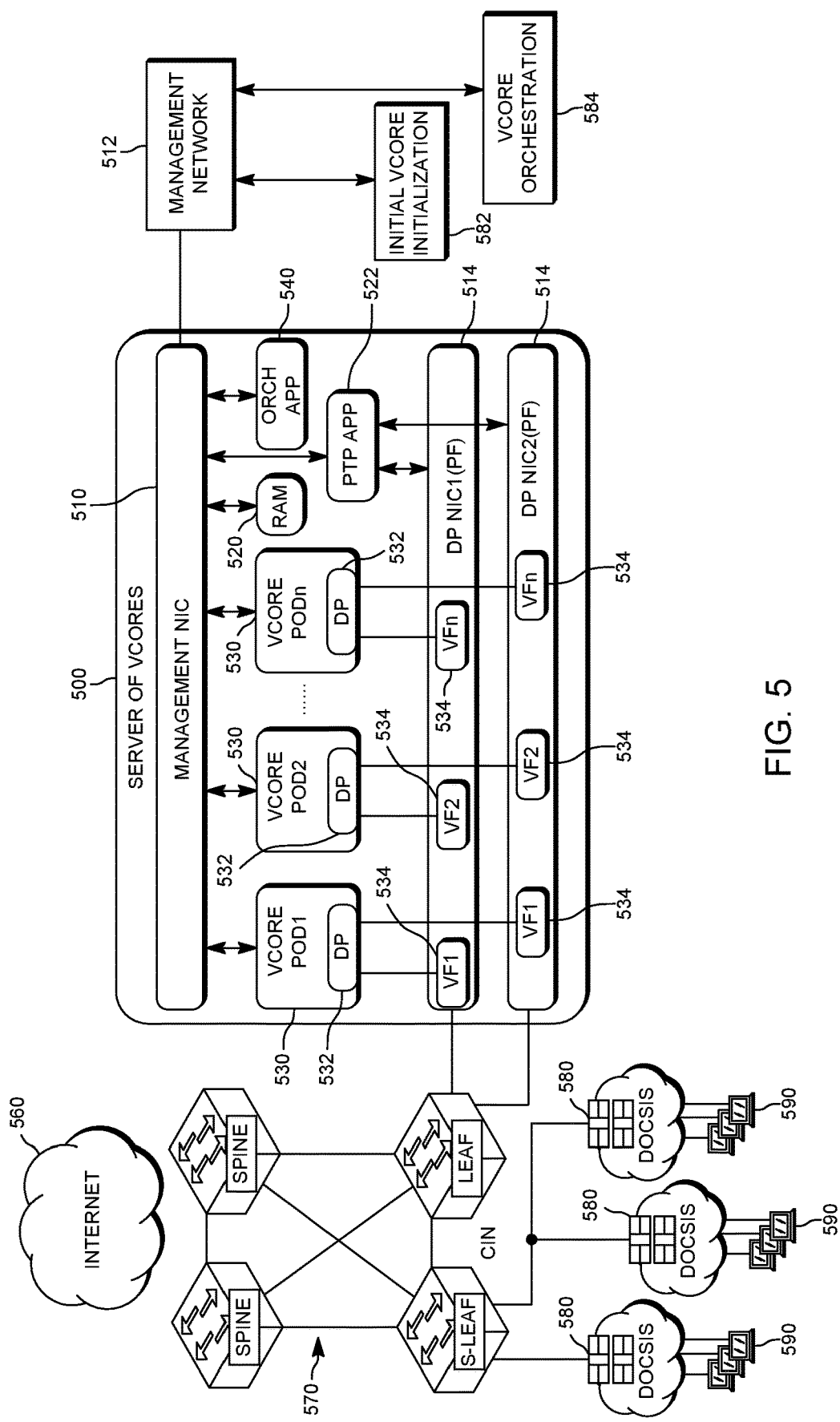
FIG. 5 illustrates a server system with containers and a container orchestration system.

Referring to FIG. 5, the vCore instances 530 may operate on a COTS server and/or "bare metal" server 500 acting as a remote PHY MAC core for one or more remote physical devices connected over a converged interconnect network, normally located in the same hub. The vCore instances 530 may include data plane software 532. Each of the vCore instances 530 as generally referred to as a POD. In some cases, multiple vCores may be included in a POD. The COTS server 500 may communicate with the Internet 560, a set of networking switches 570, to remote physical devices 580, and the customers 590. The COTS server and/or "bare metal" server including the vCore instances operating thereon is typically a relatively high performance server that has one or more of the following characteristics:

Hardware

At least one management NIC 510 is connected to, usually, a separate management network 512. The management NIC 510 is primarily used for orchestration and management of the server application, which may also manage the data traffic.

Preferably at least two (for redundancy) data plane NICs 514 (i.e., data plane physical network interfaces) together with SR-IOV and PTP (IEEE 1588) 522 are included for hardware timestamping capabilities of the data packets. The data plane NICs 514 are used to provide connectivity to the remote physical devices and the customer modems and/or set top boxes/consumer premises equipment behind such remote physical devices. The vCore instances 530 may each include a virtual function 534 network interface to each of the data plane NICs 514.

In addition, the hardware may include dedicated devices for DES encryption.

Software

Preferably the operating system on the COTS server and/or "bare metal" server is a LINUX OS such as Ubuntu, Redhat, etc.

The COTS Server and/or "bare metal" server and/or virtual machine includes container software.

The COTS Server and/or "bare metal" server and/or virtual machine and/or other server includes at least a part of a container orchestration system.

The COTS Server and/or "bare metal" server and/or virtual machine and/or other server includes a resource allocation manager (RAM) 520 that manages, at least in part, the server allocation of software and/or hardware resources for vCore instances, including for example: CPU Cores, memory, VFs, MAC addresses, etc. The RAM 520 may also provide server configuration, including OS configuration, driver support, etc., diagnostics and health monitoring. The COTS Server and/or "bare metal" server and/or virtual machine and/or other server may include an orchestration app 540 that manages, at least in part, the management of the vCores (e.g., containers and/or pods).

The COTS Server and/or "bare metal" server and/or virtual machine and/or other server may run the PTP application 522 that synchronizes the system clock of the COTS Server and/or "bare metal" server and/or virtual machine and/or vCore instances 520 based upon a grand master clock for the system as a whole. For increased accuracy, the PTP application 522 is preferably based upon hardware time stamping and a Precise Hardware Clock that is present on the NICs 514. As a general matter, the vCore preferably performs the MAC layer functionality.

The container initialization and resource allocation for the containers may be performed in a distributed fashion. An initial vCore initialization 582 may be used to perform, or otherwise cause to be performed, a default configuration of an instantiated vCore. A vCore orchestration 584 may be used to perform, or otherwise cause to be performed, a management of the instantiated vCores together with allocation of resources for particular vCores. In this manner, the initial vCore initialization 582 and the vCore orchestration 584 work together to instantiate vCores, allocate resources to vCores, and manage the resourced instantiated vCores. The initial vCore initialization 582 preferably operates in conjunction with the orchestration app 540 on the server to instantiate the default vCores. The vCore orchestration 584 preferably operates in conjunction with the orchestration app 540 on the server to perform the orchestration of the vCores. The vCore orchestration 584 preferably operates in conjunction with the RAM 520 to allocate recourses for the vCores.

As noted previously, the COTS server that includes vCore instances has allocation of resources that are managed, at least in part, by the RAM 520. During the COTS server startup phase the RAM may create multiple resource pools (CPU Cores, data plane network VFs, encryption VFs, etc.), after which the RAM may assign or lease resources from each pool to vCore PODs upon deployment as requested by the container orchestration system 540. In addition, the RAM 520 may manage data encryption and decryption that may be selectively off loaded to dedicated hardware, as desired.

The RAM 520 may include a REST API that may be used to assign and free up resources, and which may also be used to determine resource availability and allocation status. The RAM 520 may also checkpoint periodically the resource pools status to an in-memory key-value database cache with durability and use that cached data in the event of a COTS server crash. The in-memory key-value database cache is preferably unsuitable for readily random access and is more suitable for reconstruction of the data back into memory in the event that the COTS server crashes.

A vCore instance configuration is typically composed of at least two parts. The first part may be the RPHY Mac Core configuration. The RPHY Mac Core configuration includes, for example, the DOCSIS, RF, RPD, cable-mac, IP addressing, routing, etc. The second part may be the data plane configuration 532. The data plane configuration 532 and in particular a virtualized data plane for RPHY MAC Core devices configuration includes, for example, CPU Core Ids that are used by the data plane 532, data plane network VF addresses that are used by the data plane 432, MAC addresses for the interfaces, encryption VFs addresses that are used for encryption offload, memory allocation, etc. In many embodiments, the RPHY Mac Core configuration is provided by the multiple system operators prior to actual configuration. The vCore instance of the data plane 532 may be determined based upon the resource information received from the RAM 520 by the vCore instance itself during the initialization phase.

As previously described, a vCore is, in general, a software implementation of a CMTS core which includes data plane functionality that routes data packets between the public Internet and consumer premises equipment. The ability of a vCore to provide CMTS services is a function of the capabilities of the underlying hardware, which is typically a COTS server. Such COTS servers maintained within a data center typically include one or more processors, each of which normally includes an integrated plurality of cores (e.g., 4, 8, 16, 20, or more). In general, each core of each processor may be considered as its own computing system in that it has its own instruction pipeline, decoder, stack, and available memory. A software program that is decomposable into smaller parallel processing chunks may be substantially accelerated by scheduling the independent processing chunks to different cores of a multi-core processor and executing the independent processing chunks in at least a partial parallel manner. For example, a set of 10 independent functions can be split onto 10 cores and, if each function takes the equivalent time to complete, will execute generally 10 times faster than running all the 10 independent functions on a single core of a single core processor or on a single core of a multi-core processor. Accordingly, decomposing a software program into sub-programs and scheduling the sub-programs to be executed simultaneously on multiple cores of a processor provides acceleration of the processing and increases the efficiency of the hardware in terms of running more instructions per second when considering all the cores within the processor.

For a vCore, it is often desirable to reserve at least one of the cores for selective compute intensive operations, such as real-time data plane packet processing to maximize the performance throughput of the data packets.

To instantiate a virtual core or otherwise install software on one or more remote physical devices is a complicated task. Typically, the process for the installation of software is a complicated and burdensome task. All of the software drivers for each of the hardware devices needs to be selected and installed. Each version of the software drivers for each of the hardware devices tends to have different characteristics and may be incompatible with other software and/or hardware. Accordingly, while the installer may select a driver for each hardware device, there is a strong likelihood that the installer will not select all of the appropriate drivers for the particular software environment and/or other hardware devices that are going to be used in the environment. All of the various software programs, many of which are separately developed using different environments, needs to be selected and installed. Each version of the software programs tend to have different characteristics and may be incompatible with other software and/or hardware. Accordingly, while the installer may select a software program, there is a strong likelihood that the installer will not select all of the appropriate drivers for the particular software environment and/or other hardware devices that are going to be used in combination with the selected software programs. As it may be observed, for an environment with a substantial amount of hardware resources, all of which needs to process data in real-time, the installation of the appropriate versions of the hardware drivers in combination with the appropriate versions of the software programs is difficult, and prone to error. Also, the installer may tend to use incomplete file sets which further complicates the installation.

In addition, as the installer begins to install each of the software programs and the hardware drivers (a software program), they may tend to obtain each of them in a serial manner and install them in a serial manner as they are obtained. Unfortunately, often in the middle of the installation process, the installer is unable to locate a particular required software program and/or hardware driver, resulting in a failed install. Also, as a result of only completing part of the installation process, the entire collection of software programs and hardware drivers will not permit the vCore and/or remote physical device to operate, resulting in a substantial service outage for the customers.

Further, the destination may need to have particular files located at particular locations, and installations performed in a particular manner at a particular destination. In some cases, the file locations may not exist, or the installations cannot be performed for the particular destination, resulting in an installation failure. Also, in many cases there needs to exist particular pre-installed software and/or drivers at the destination, and the failure to have such pre-installed software and/or drivers will result in an installation failure.

Moreover, the order in which particular software programs and hardware drivers are installed tend to have dependencies, where a first one needs to be installed prior to a second one. If the order of installation is reversed, either one or both will not install properly or otherwise may not operate properly, resulting in a substantial service outage for the customers.

Figure 6:
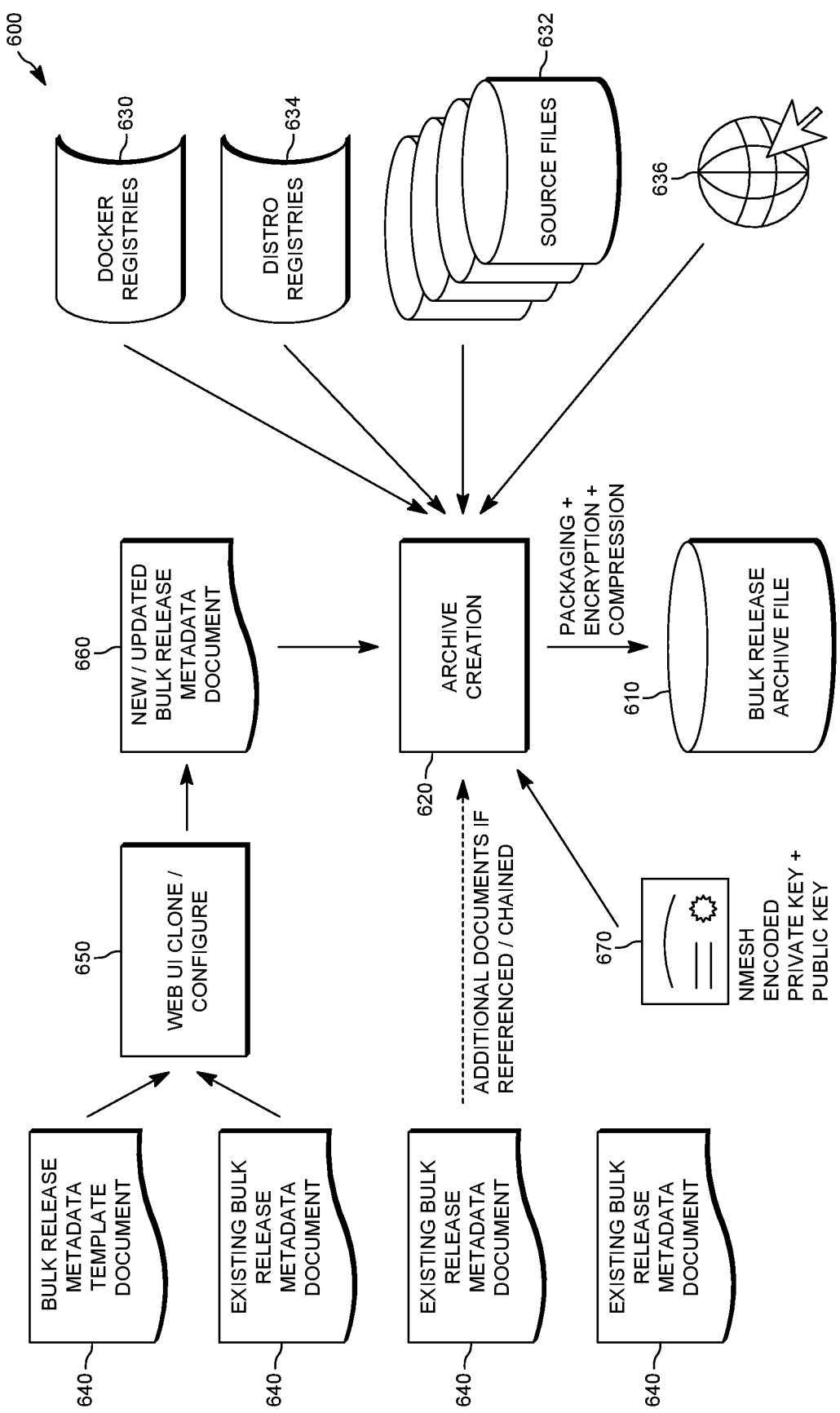
FIG. 6 illustrates a creation process flow.

Referring to FIG. 6, it is desirable to use a packaging system 600 for software delivery that generates an archive file 610 with the software to be deployed. The packaging system is suitable to package the archive 620 by archiving various disparate technologies that are not typically packaged together with one another. For example, the archive may include docker registries 630. The docker registry is a storage and content delivery system for holding docker images which are suitable for deployment. For example, the archive may include source files 632. The source files may be any type of software program, software driver, executable(s), data file(s), or otherwise that are suitable to be included in the form of a file, such as a .tar file, a .zip file, an executable, or otherwise. For example, the archive may include distro registries 634. The distro registries may be distribution images, such as the underlying operating system (e.g., Red Hat, Ubuntu). For example, the archive may include web services 636 (e.g., network based deliver service). The web services may be files, executables, installers, or otherwise that are available over a network, such as the Internet. In some cases, there are licensing restrictions or other considerations that make packaging the software and/or drivers and/or files available over the Internet into the archive file 610 impractical or in violation of a licensing restriction. However, it is desirable to include at least a reference to where the software and/or drivers and/or files can be obtained when they are required for extraction and/or deployment. As it may be observed, the docker registries 630, the source files 632, the distro registries 634, and/or web services 636 are traditionally disparate materials with different sources that are not previously included within a single packaging system for software delivery. In this manner, the archive creation 620 is capable of bringing together content from different technologies, from many different types of locations that have source content for the destination system, into a monolithic archive file 610.

The packaging system 600 may use a bulk release metadata template document 640, such as a JavaScript Object Notation based metadata file, that describes which docker registries 630, distro registries 634, source files 632, web services 636, or otherwise, inclusive of versioning information (a particular version, selected versions, or range of versions) for each, that should be included in the archive file 610. Available software programs and/or drivers are preferably included in the archive file 610 so they can be provided as a single distribution. The template document 640 may identify location information where the software and/or driver to be included in the archive file 610 may be located or otherwise obtained. The template document 640 may also include deployment information to ensure the destination environment is suitable, inclusive of distribution, extraction, and deployment. In this manner, the template document 640 preferably includes a complete identification of the software programs, files, drivers, and otherwise to effectuate a distribution, extraction, and deployment that is unlikely to result in failures. A web based user interface 650 may be used to clone or otherwise configure a new/updated bulk release metadata document 660 for a particular destination environment that is used to create the archive file 610.

The metadata document 660 may include information maintained within the archive 620 that indicates extraction dependencies between the different software applications and drivers. For example, the metadata document 660 indicates what drivers are to be installed on which hardware devices. For example, the metadata document 660 indicates where some of the software programs are to be installed. For example, the metadata document 660 indicates where some of the files are to be stored, such as in particular directories. For example, the metadata document 660 indicates where some of the files are to be obtained from, such as a web service.

The metadata document 660 may include information related to the content maintained within the archive 620 that indicates deployment dependencies between the different software applications and/or drivers. For example, the metadata document 660 indicates what drivers are to be installed on which hardware devices, and further possibly in what order. For example, the metadata document 660 indicates which software programs are to be installed in what order. By indicating the order for installation, at least to some degree, reduces the likelihood of one software program being dependent on another software program that failed to install. For example, the metadata document 660 indicates where some of the software programs and/or files are to be stored and/or installed, such as in particular directories. For example, the metadata document 660 indicates what other software programs, drivers, and/or files need to be already present at the designation in order for the archive to properly extract and/or deploy. In this manner, the extraction and/or deployment dependencies specify the characteristics of the destination environment and the order of installation (including deployment) of different aspects of the archive file 610. By way of example, the dependency defined by the metadata document is flexible in the identification of the dependency between, particular software drivers, particular firmware on network interface cards, particular firmware on particular network interface cards, a particular version of the operating system kernel, particular microservices, particular docker software, particular Kubernetes software, particular data files, particular software applications, or otherwise, together with particular software, driver, and/or files already installed at the destination. If the destination environment does not include the necessary files and software programs, the storage of files in particular directories, and the order of installation is not performed in the proper order, then there is a strong likelihood that the resulting deployment will fail or otherwise not function properly. The system may inhibit the distribution, extraction, and deployment if one or more of the characteristics identified in the metadata document 660 are not satisfied.

As it may be observed, the metadata document ensures that the proper versions of software programs and software drivers are used, and that the software programs from disparate code basis, software drivers, and other files are located and installed in the appropriate locations, in some cases installed in a proper order, on an environment with suitable characteristics (e.g., directories, files, hardware, connectivity, installed software, installed drivers, etc.).

It may also be observed that the packaging system 600 is preferably not a part of the software environment for which the software programs are included. For example, the packaging system 600 is separate from the docker environment.

The packaging system 600 may also support multiple destination environments, each of which is different from one another. For example, a first destination may require a first set of files together with their interdependencies, while a second destination may require a second set of files together with their interdependencies. Typically, there is a substantial overlap in the files required for the first destination and the second destination, such as they are both remote physical devices. The packaging system 600 may package together both set of files into the archive file 610, together with metadata identifying each of the respective destination environments and the files associated with each of the environments. In this manner, a single archive file 610 may be used for different destination environments, which may simplify the distribution of archive files. When the single archive file 610 is extracted and/or deployed, it may be done in a manner consistent with the characteristics of the destination environment. By way of example, a first driver software may be extracted and/or deployed when a first network interface card is present, while a second driver software may be extracted and/or deployed when a second network interface card is present. In this manner, the archive file 610 is suitable for supporting a range of ecosystems, each of which is incompatible with one another if the same archive file 610 were extracted and/or deployed thereon. This flexibility is especially suitable for vCores, because the supporting hardware tends to be highly variable. For example, a first vCore may be associated with a first hardware interface card, a second vCore may be associated with a second hardware interface card that is different than the first hardware interface card, the first vCore may be supported on a first type of server while the second vCore may be supported on a second type of server where the software programs that are operable on each server are different from one another.

For increased compression efficiency, preferably each of the software programs and/or drivers and/or files are separately compressed into a corresponding compressed file (e.g., .tar, .zip). A public key 670 may be used to encrypt each of the files into a compressed file. The collection of compressed files are then collectively compressed into a corresponding compressed file using the public key 670. The destination in a similar manner uses a private key to decompress the collection, then uses the private key to decompress each of the compressed files within the decompressed collection.

In many situations, only a single file or selected files, such as a software program and/or driver software is updated. To increase the efficiency of the distribution of a software program, a hardware driver, or otherwise, the archive file may include the single file or selected files together with a metadata document 660 that references another metadata document. In addition, a first metadata document may reference a second metadata document, which in turn references a third metadata document, which in turn references a fourth metadata document, and so forth.

The extraction process at a destination may not necessarily need all of the files provided in the archive file 610. In this case, it is computationally inefficient to extract the entire archive file 610, and decode the encryption, to obtain a selected subset of the files. The files in the archive may be broken down by groups referred to as packages, which may further be subdivided into a plurality of components. The packages may refer to those portions that are suitable to run, upgrade, together with extraction dependencies. To facilitate selecting individual files from within an archive, such as individual compressed files (e.g., a software driver), the metadata document (or otherwise) may include references within the archive file 610 to identify the selected packages and/or selected components. In this manner, the packaging system 600 may extract the desired packages and/or components (e.g., a software driver) without having to extract the remainder of the archive file 610. The extraction may be based upon an internal storage archive path within the archive file 610. In this manner, an extraction process may read the configuration file to select the packages and/or components therefrom.

Figure 7:
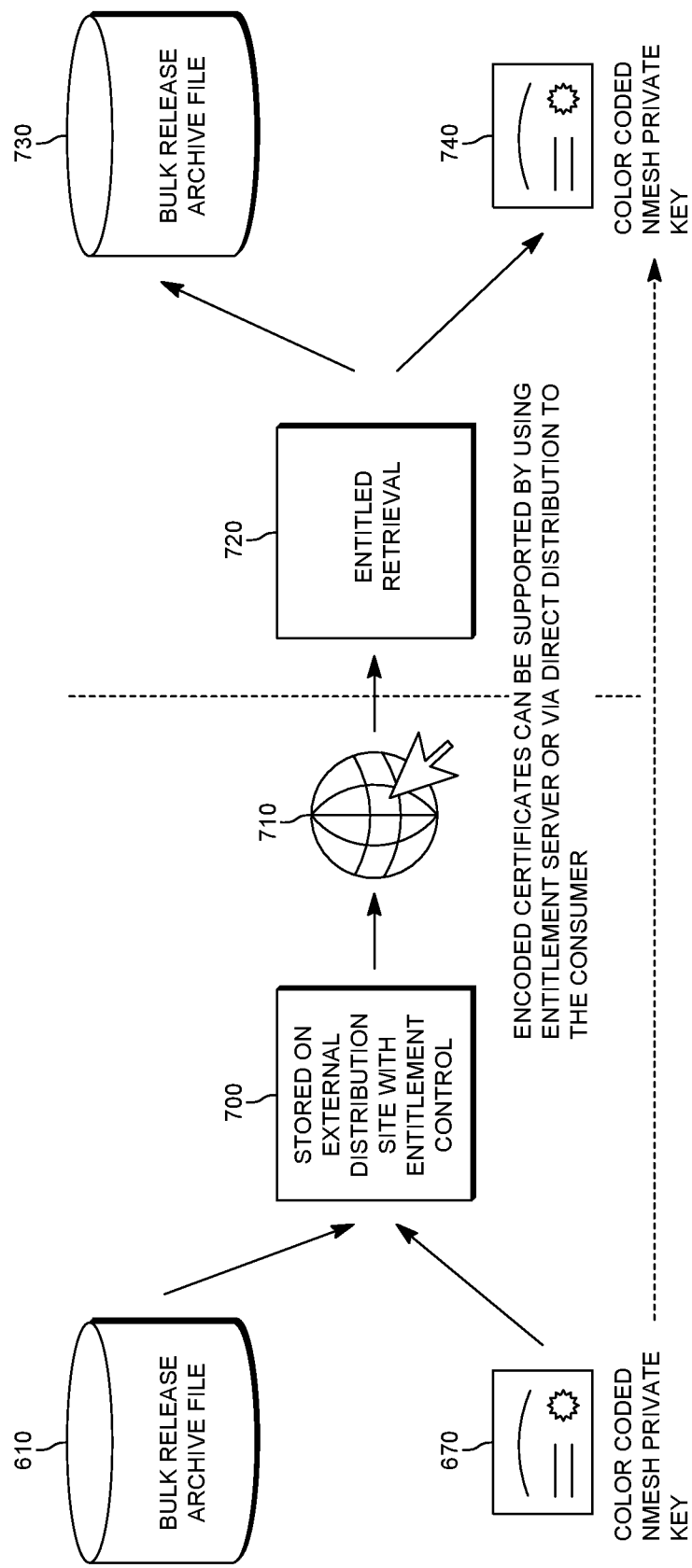
FIG. 7 illustrates a distribution process flow.

Referring to FIG. 7, the archive file 610 is stored on an external distribution site with entitlement control 700. With appropriate access rights, the archive file 610 may be provided across a network 710 to a destination, such as a vCore or a remote physical device. The destination may receive or otherwise request the archive file 610, based upon an entitled revival 720. A copy of the archive file 610 may be transferred and stored on the destination as the bulk release archive file 730. A private key 740 may be provided through the entitled retrieval 720 or otherwise provided through an out of band technique. The private key 740 may be used to decrypt the compressed archive file 730 including compressed files therein. The packaging system 600 may track which archive files have been made available to the destination and/or which archive files have been transferred to the destination.

Figure 8:
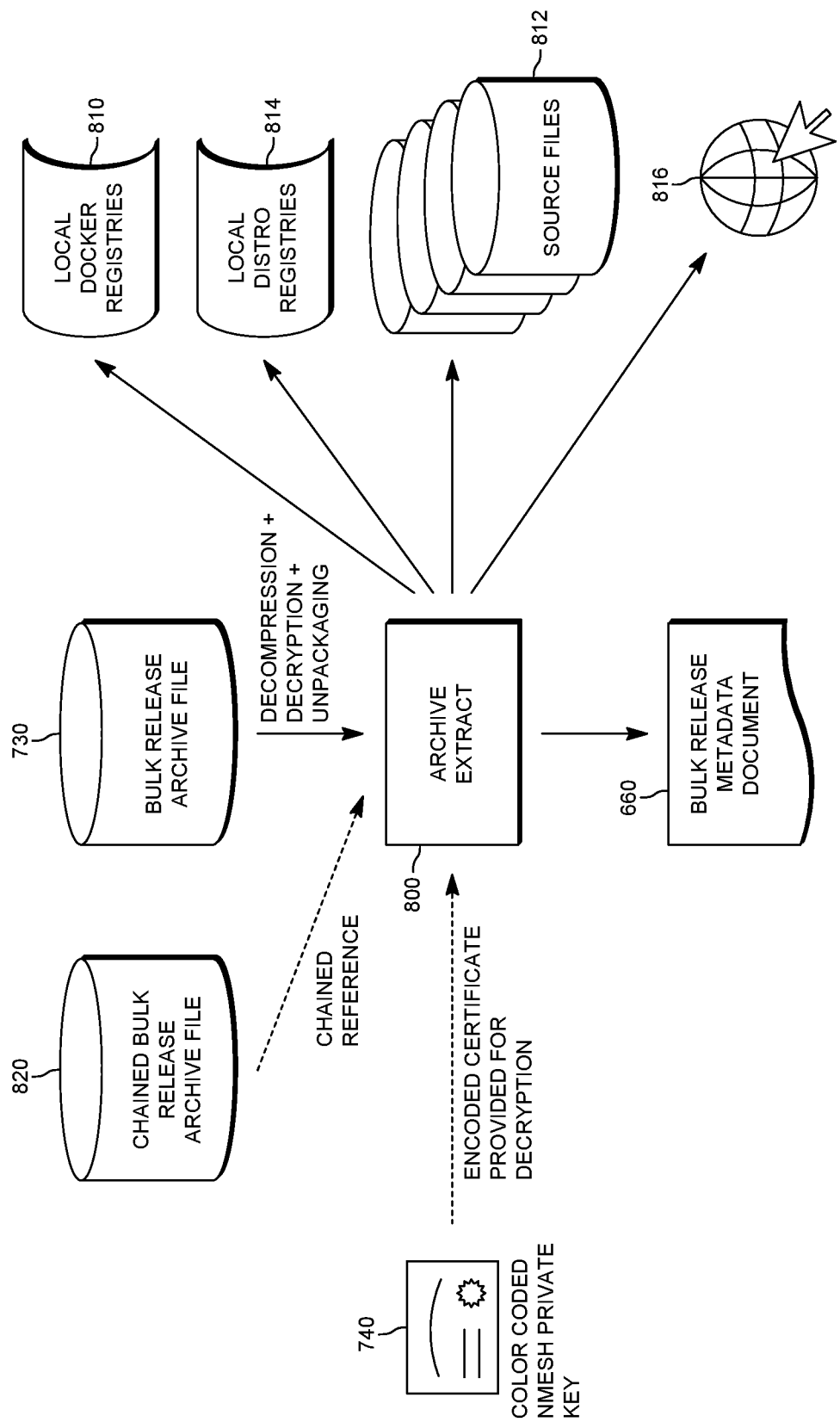
FIG. 8 illustrates an extraction process flow.

Referring to FIG. 8, the archive file 730 may be extracted by an archive extraction 800 by the packaging system 600. Prior to extraction, based upon the bulk release metadata document 660, the archive extraction 800 verifies that the necessary pre-installed software environment exists. Prior to extraction, based upon the bulk release metadata document 660, the archive extraction 800 also verifies that the packages and components are not corrupted, and that all web services that will be needed to have a successful extraction are otherwise available to be downloaded. Prior to extraction, based upon the bulk release metadata document 660, the archive extraction 800 verifies that the desired web services are available to be downloaded. Prior to extraction, based upon the bulk release metadata document 660, the archive extraction 800 verifies that the other files that are necessary exist and that any directory structures that are required likewise exist. Prior to extraction, based upon the bulk release metadata document 660, the archive extraction 800 verifies that the necessary hardware devices, such as network interface cards, are present.

The archive extraction 800 may also verify that any chained bulk release archive files 820 are likewise available at the destination device, based upon the bulk release metadata document 660. Further the archive extraction 800 may also verify that any installed files that are expected to be present are still present in the anticipated locations.

Further the archive extraction 800 may also verify that any execution/installation dependencies based upon the bulk release metadata document 660 are satisfied.

Figure 9:
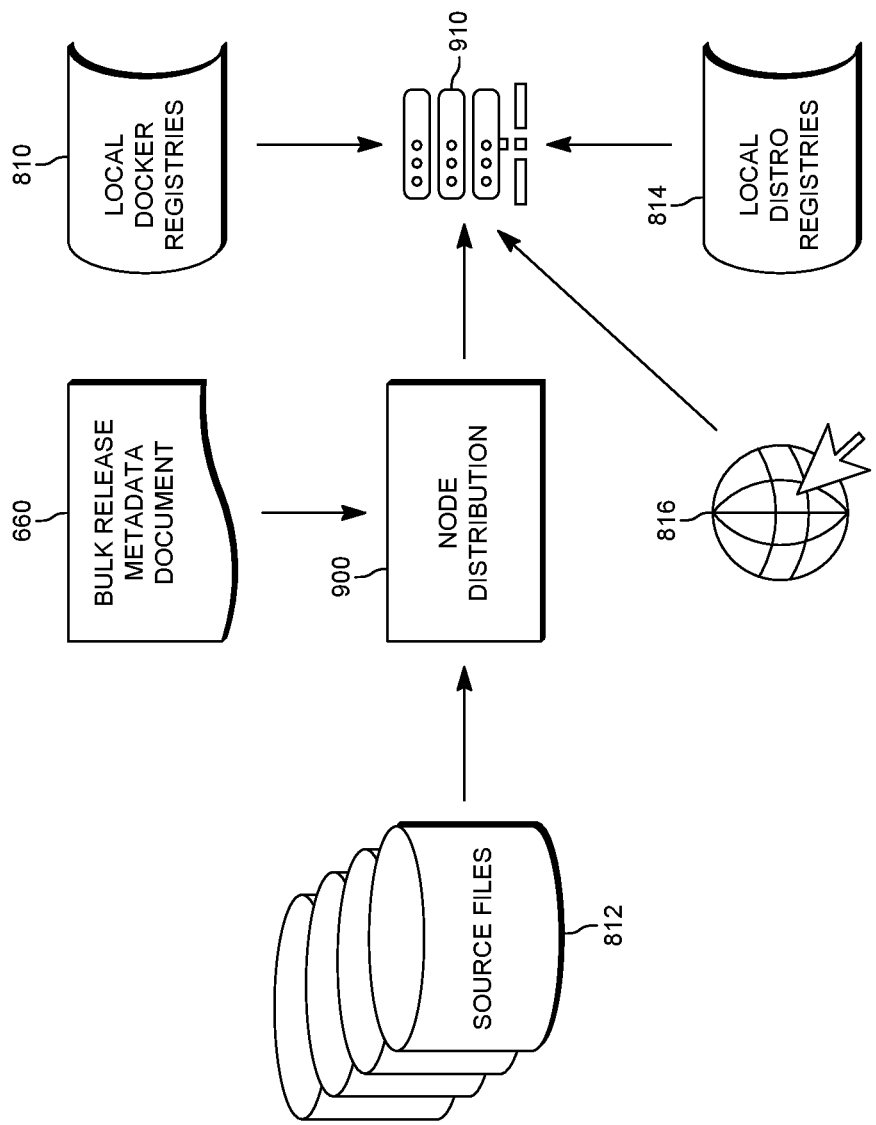
FIG. 9 illustrates a deployment process flow.

Referring to FIG. 9, the local docker registries 810, the source files 812, the web services 816, the local distro registries 814, or otherwise, may be distributed to a destination 910 by a node distribution 900 of the packaging system 600. The node distribution 900 may be performed using orchestration tools which use the metadata information from the bulk release metadata document 660. The dependencies in the metadata for specific content guide what will block installation of specific sources. If an alternative to the block does not exist which satisfies the dependencies, the entire or partial distribution process may be disrupted or otherwise terminated. The nodes may be updated to meet the dependency requirements allowing for the distribution phase. As it may be observed, the verification that the files, environment, and/or hardware exists is performed at both the deployment process and the extraction process, which ensures modifications have not occurred between the extraction and the deployment.

Figure 10:
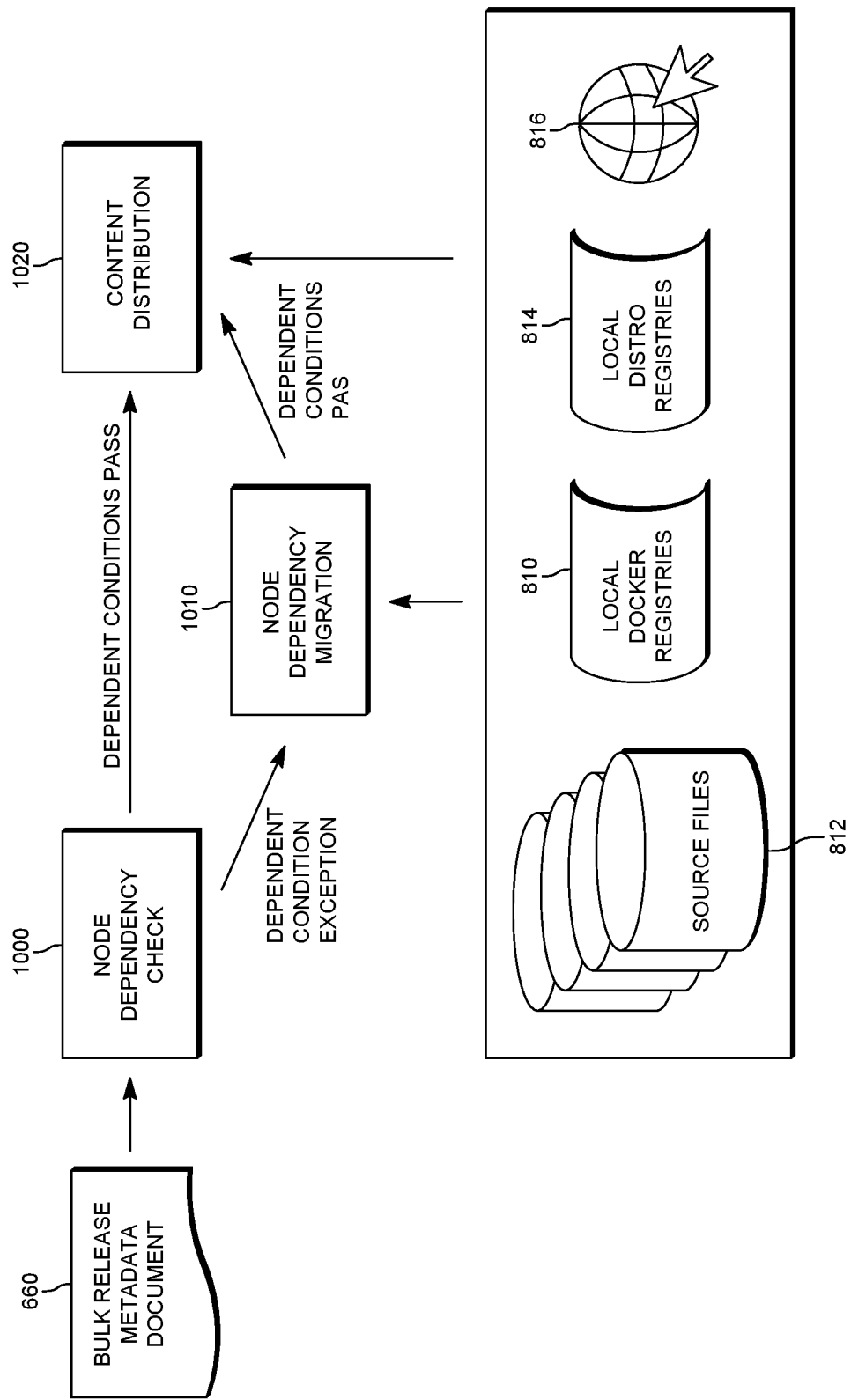
FIG. 10 illustrates a node dependency process flow.

Referring to FIG. 10, a node dependency may be performed. The combination of a node dependency check 1000, a node dependency migration 1010, and content distribution 1020 may be used so the content is distributed and/or deployed in phases using orchestration tools which make use of the metadata information from the archive file. The nodes which require migration while in service are taken out of service, migrated, and then are a candidate for new content.

The packaging system may be for other software deployments.

Figure 11:
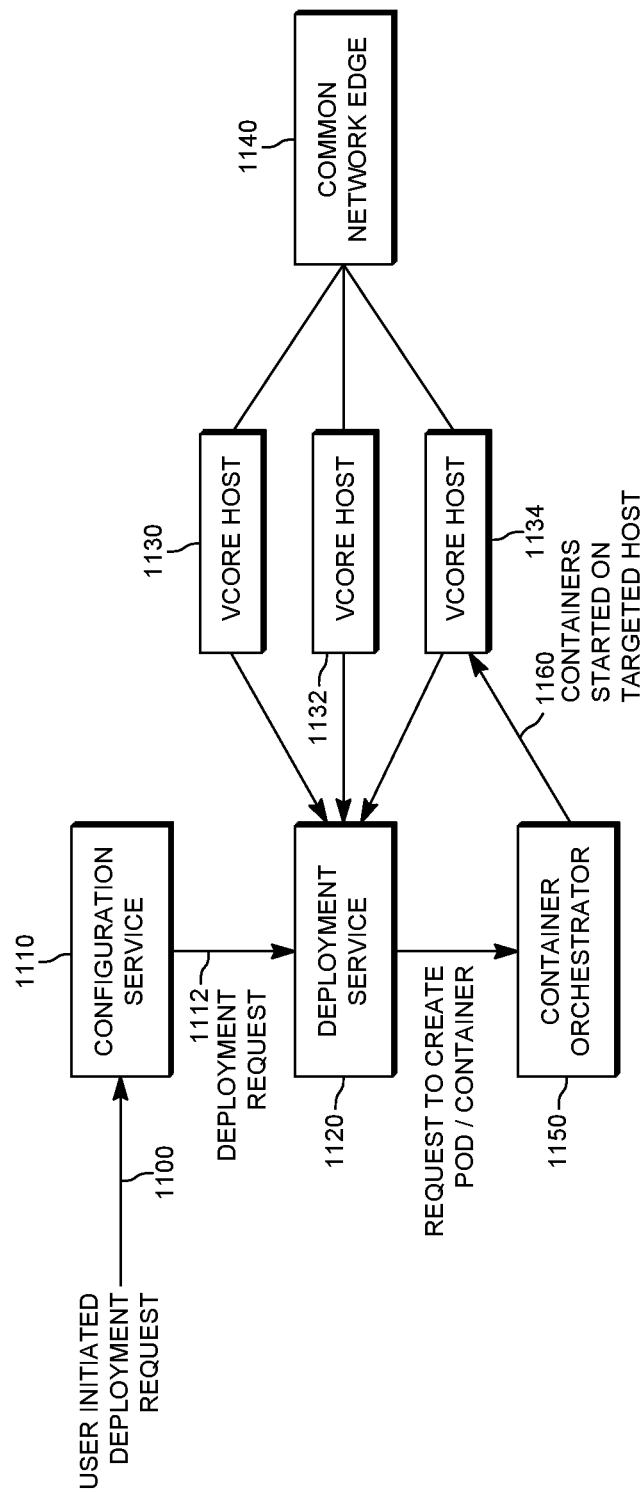
FIG. 11 illustrates a vCore deployment request.

Referring to FIG. 11, an operator may manually deploy a vCore on a server by initially selecting an appropriate server to instantiate the vCore on. Then the operator may use orchestration software to create a POD into which a container including the vCore is included.

A lifecycle manager for a system that includes vCores may receive a user initiated deployment request 1100 for a vCore. In this manner, a user may initiate the deployment of an additional vCore to be performed in an automated manner that reduces the likelihood of deployment failures and other conflicts. A configuration service 1110 may receive the user initiated deployment request 1100. If desired, the user initiated deployment request 1100 may include the desired size of the vCore, such as a vCore that uses 1 core (or logical core) for downstream dataplane services and 1 core (or logical core) for upstream dataplane services, or such as a vCore that uses 2 cores (or logical cores) for downstream dataplane services and 1 core (or logical core) for upstream dataplane services. In this manner, the number of cores (or logical cores) dedicated to a particular vCore may be selected, as desired. Further, each size of vCore may include one or more different software configurations which may be selected by the user initiated deployment request 1100, among the available options. The vCores may share other cores not dedicated to dataplane services.

As an initial matter, the configuration service 1110 may make a deployment request 1112 to a deployment service 1120, such as a microservice, that manages the deployment of a vCore. The deployment service 1120 may query vCore hosts (e.g., servers) 1130, 1132, 1134 that are within the same deployment host group (e.g., network edge). The deployment host group typically shares a similar layer 2 domain, as well as the similar layer 3 domain, so that all the logical interfaces of the vCores of the deployment host group can be shared among one another by any one of the hosts. The deployment service 1120 queries the vCore hosts to obtain the status of each of the hosts and the resource usage of each of the hosts. For example, the resource usage may include network single root I/O virtualization interfaces which share one or more physical resources of the network interface, such as a memory and a network port. For example, the resource usage may include processor cores (or logical cores) that are dedicated to dataplane services, such as cores (or logical cores) dedicated for downstream dataplane services and cores (or logical cores) dedicated to upstream dataplane services for each of the vCores. For example, the resource usage may include the status of a precision time protocol for each of the vCores. For example, the resource usage may include the health (whether the operational status is as anticipated or not as anticipated) of each of the vCores and/or hosts. For example, the resource usage may include a bulk release dependency check, as previously described. For example, the resource usage may include a consideration of the number of vCore instances that are currently in a starting state, as described later. The deployment service 1120, based upon the status and/or resource usage may select a particular host 1130, 1132, 1134, for an additional vCore that includes a common network edge 1140 that is bound within the same layer 2 domain allowing any vCore host to be used to support the vCore instance. It is noted that edge domains are typically of a smaller size due to address space sizing and concern of broadcast storms and misbehaving traffic. Also, edge domains are also limited by port counts on the leaf, s-leaf, and spine arrangements. Once a suitable host has been selected by a selection technique, a POD and a container deployment may be requested to a container orchestrator 1150 by the deployment service 1120 to create a POD and a container. The container orchestrator 1150 starts the container within the POD on the selected host 1160.

Figure 12:
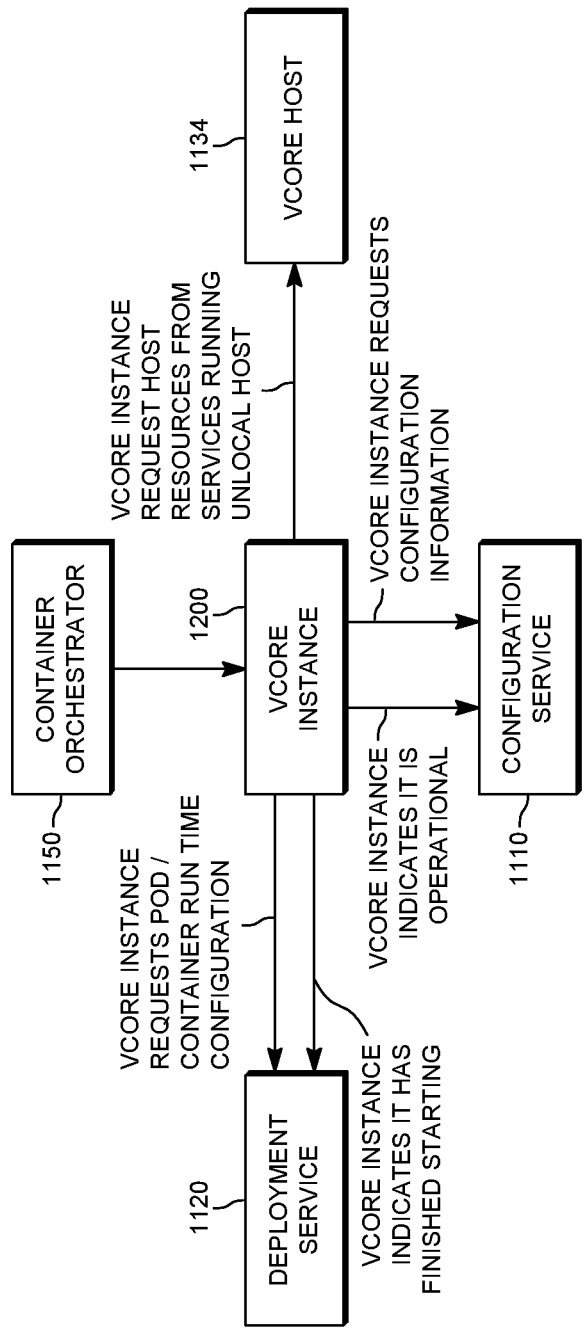
FIG. 12 illustrates a primary vCore instance startup.

Referring to FIG. 12, the container orchestrator 1150 after determining a suitable host 1134 may instantiate a vCore instance 1200 on the selected host based upon configuration data. In general, there are two sources of configuration data. A first source of configuration data defines the manner in which the ecosystem within the POD operates. A second source of configuration data defines the manner in which the vCore instance itself operates. Accordingly, the first source of the configuration data defines the environment and the second source of the configuration data defines the vCore within the environment. The vCore instance 1200 requests POD and container run time configuration data from the deployment service 1120. The deployment service 1120 may provide such run time configuration data, such as for example, how many cores to be used for the dataplane (e.g., upstream dataplane services and downstream dataplane services), and the number of network interfaces. The vCore instance 1200 then requests host resources from services on the selected vCore host 1134. The vCore instance 1200, with the host resources determined and secured, requests configuration information from the configuration service 1110. With the host resources determined and secured, together with configuration information for the vCore itself, the vCore instance 1200 provides confirmation to the deployment service 1120 that the vCore instance has completed starting. With the deployment service 1120 provided an indication that the vCore instance has finished starting, the configuration service 1110 is provided confirmation that the vCore instance is operational. This management of the instantiation of a vCore and other services by using the configuration service 1110 and the deployment service 1120, permits the lifecycle management system to 'throttle' the number of vCores that may be simultaneously instantiated, such as one at a time or two at a time. In this manner, since many of the cores of the processor may be dedicated to dataplane services, the remaining cores of the processor available for other services, such as vCore instantiation, will reduce the likelihood of saturating the processor that may result in a core dump of the processor and all vCores operating thereon.

Figure 13:
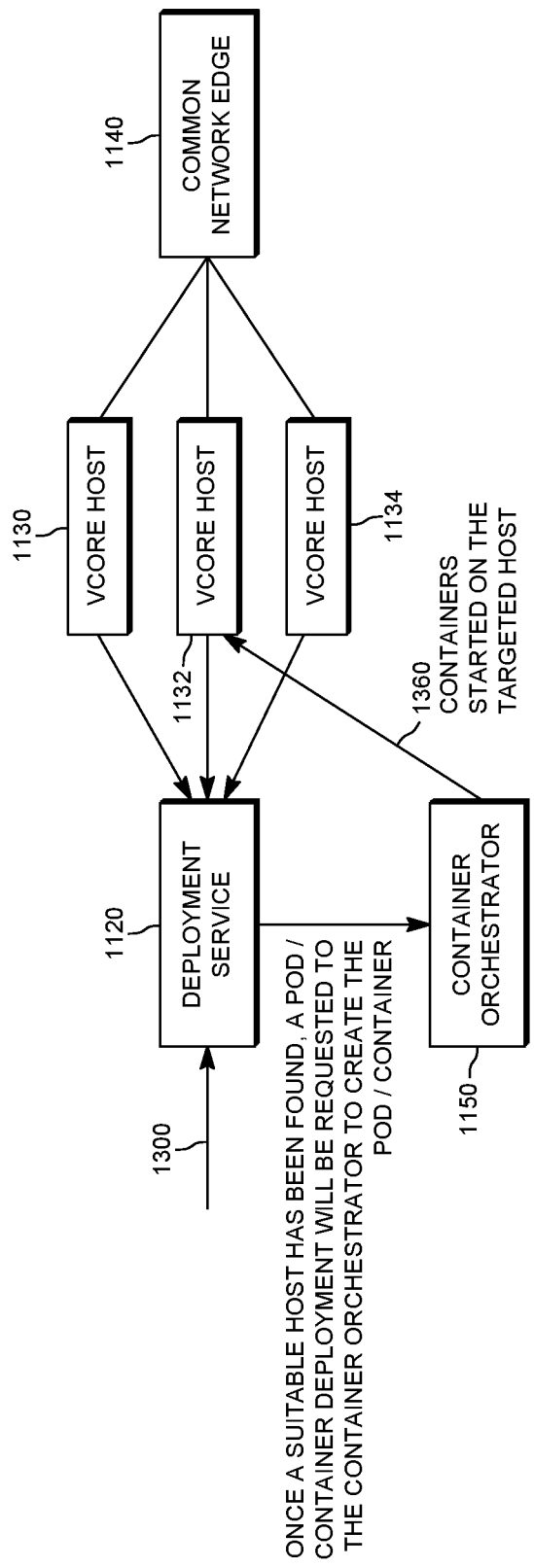
FIG. 13 illustrates a standby pod startup.

Referring to FIG. 13, it is desirable to configure a standby POD so that it is already prepared in the event of the failure of another vCore and/or POD so that it will be ready to be used, which reduces the service interruptions to customers as a result of the failure. The lifecycle management system, such as the configuration service 1110, may determine that a standby POD is desired 1300 and provides such an indication to the deployment service 1120. The deployment service 1120 may query vCore hosts (e.g., servers) 1130, 1132, 1134, that are within the same deployment host group (e.g., network edge). The deployment host group typically shares a similar layer 2 domain, as well as the similar layer 3 domain, so that all the logical interfaces of the vCores of the deployment host group can be shared among one another by any one of the hosts. The deployment service 1120 queries the vCore hosts to obtain the status of each of the hosts and the resource usage of each of the hosts. For example, the resource usage may include network single root I/O virtualization interfaces which share one or more physical resources of the network interface, such as a memory and a network port. For example, the resource usage may include processor cores (or logical cores) that are dedicated to dataplane services, such as cores (or logical cores) dedicated for downstream dataplane services and cores (or logical cores) dedicated to upstream dataplane services for each of the vCores. For example, the resource usage may include the status of a precision time protocol for each of the vCores. For example, the resource usage may include the health (whether the operational status is as anticipated or not as anticipated) of each of the vCores and/or hosts. For example, the resource usage may include a bulk release dependency check, as previously described. For example, the resource usage may include a consideration of the number of vCore instances that are currently in a starting state, as described later. In addition, a scheduling system may determine the vCore host placement to further ensure host redundancy, in the event that any particular host were to fail, so that the vCores may be reallocated to other available hosts. The deployment service 1120, based upon the status and/or resource usage may select a particular host 1130, 1132, 1134 for an additional vCore that includes the common network edge 1140 that is bound within the same layer 2 domain allowing any vCore host to be used to support the vCore instance. It is noted that edge domains are typically of a smaller size due to address space sizing and concern of broadcast storms and misbehaving traffic. Also, edge domains are also limited by port counts on the leaf, s-leaf, and spine arrangements. Once a suitable host has been selected by a selection technique, a POD and a container deployment may be requested to the container orchestrator 1150 by the deployment service 1120 to create a POD and a container. The container orchestrator 1150 starts the container within a POD on a selected host 1360.

As a general matter, the system may create a POD and a separate vCore instance. The POD when initially created does not include particular identifying characteristics of the environment that it is to be operated in. By way of example, the POD may initially not include sufficient configuration information to provide dataplane services. When it is desirable to use the vCore instance, it is mapped onto the POD, together with providing configuration data to both the POD and the vCore, so that dataplane services may be subsequently provided. By way of example, the deployment services 1120 understands the 'concept' of a POD and manages the deployment of PODs, and their configuration thereof. By way of example, the configuration services 1110 understands the 'concept' of a vCore and manages the deployment of vCores and their configuration thereof. It is also noted that the PODs are preferably deployed with a predetermined N to 1 redundancy across the hosts and the hosts are configured to be 1 to 1 redundant for the services provided by each of them.

Figure 14:
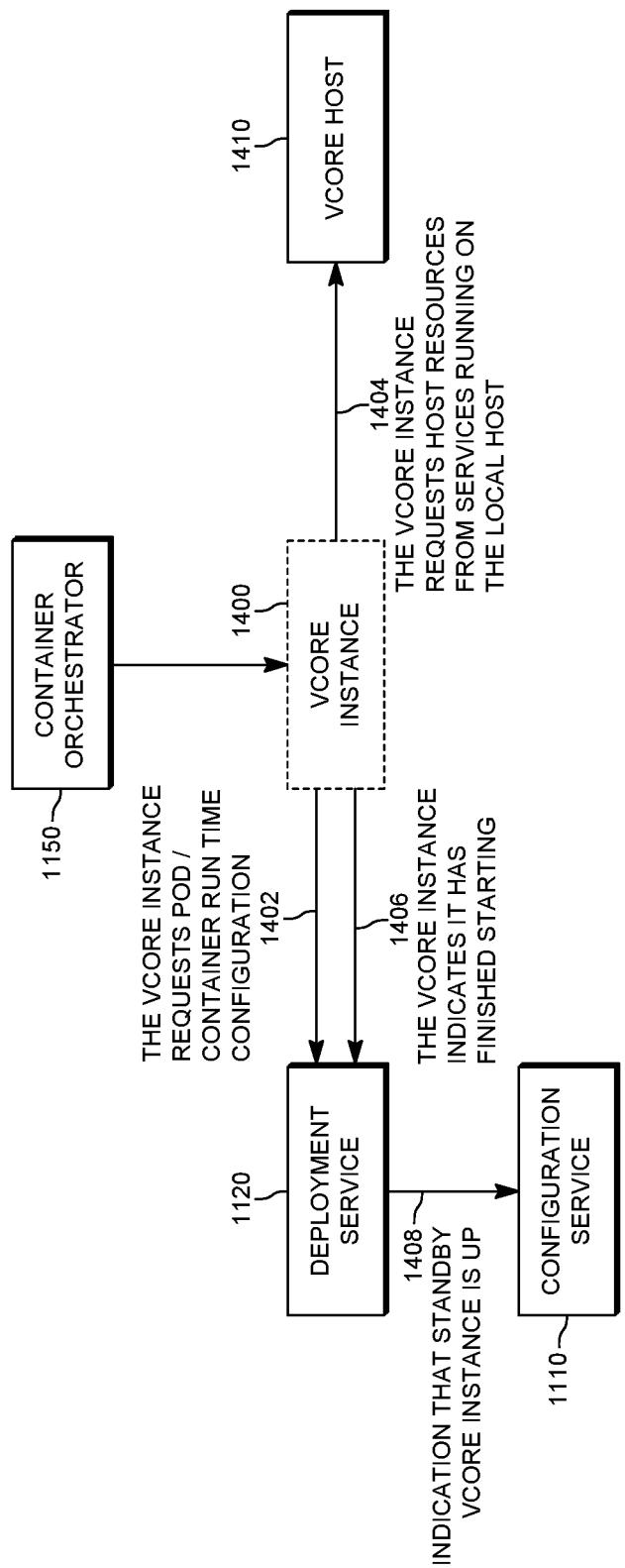
FIG. 14 illustrates a vCore instance standby startup.

Referring to FIG. 14, the container orchestrator 1150 may startup a standby vCore instance 1400. In general, there are two sources of configuration data. A first source of configuration data defines the manner in which the ecosystem within the POD operates. A second source of configuration data defines the manner in which the vCore instance itself operates. Accordingly, the first source of the configuration data defines the environment and the second source of the configuration data defines the vCore within the environment. The vCore instance 1400 requests POD and container run time configuration data 1402 from the deployment service 1120. The deployment service 1120 may provide such run time configuration data, such as for example, how many cores to be used for the dataplane (e.g., upstream dataplane services and downstream dataplane services), and the number of network interfaces. The vCore instance 1200 then requests host resources 1404 from services on the selected vCore host 1410. The vCore instance 1200, with the host resources determined and secured, does not yet request configuration information from the configuration service 1110 because it will remain a standby vCore instance. With the host resources determined and secured, without the configuration information for the vCore itself, the vCore instance 1200 provides confirmation 1406 to the deployment service 1120 that the vCore instance has completed starting. With the deployment service 1120 provided an indication that the vCore instance has finished starting, the configuration service 1110 is provided confirmation 1408 that the vCore instance is up and ready to be configured. This management of the instantiation of a vCore and other services by using the configuration service 1110 and the deployment service 1120, permits the lifecycle management system to 'throttle' the number of vCores that may be simultaneously instantiated, such as one at a time or two at a time. In this manner, since many of the cores of the processor may be dedicated to dataplane services, the remaining cores of the processor available for other services, such as vCore instantiation, will reduce the likelihood of saturating the processor that may result in a core dump of the processor and all vCores operating thereon.

Figure 15:
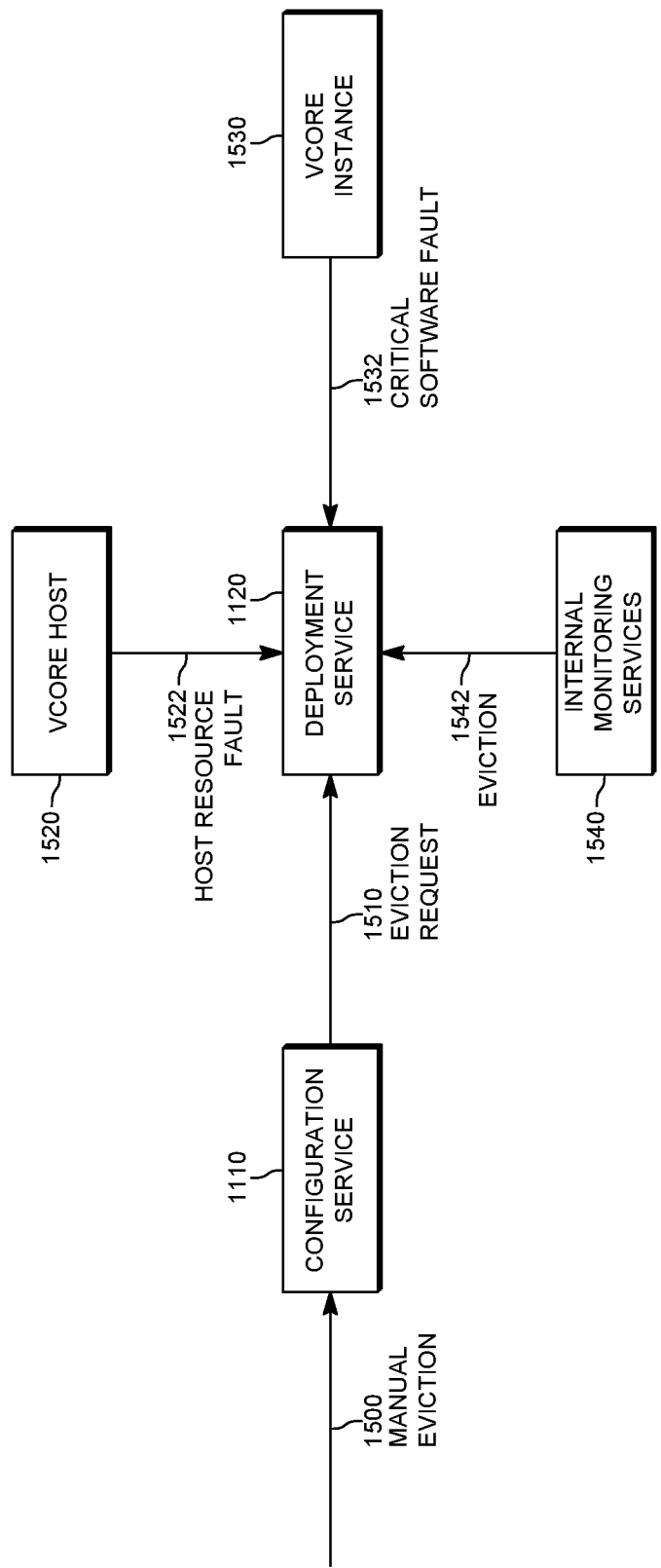
FIG. 15 illustrates a vCore instance fault detection.

Referring to FIG. 15, the lifecycle manager may include multiple different techniques to determine whether a fault has occurred in the system. The lifecycle manager may include receiving a manual eviction 1500, such as from an operator, by the configuration service 1110. The configuration service 1110 provides an eviction request 1510 (i.e., fault) to the deployment service 1120. The lifecycle manager may include receiving a host resource fault 1522 from a vCore host 1520 by the deployment service 1120. The lifecycle manager may include receiving a critical software fault 1532 from a vCore instance 1530 by the deployment service 1120. The lifecycle manager may include receiving an eviction 1542 (i.e., fault) from any internal monitoring services 1540 by the deployment service 1120. In this manner, a fault may be detected from a plurality of different sources so that appropriate action may be taken to maintain service to the customers.

By way of example, the user may initiate an upgrade of the POD and/or vCore instance by creating a new POD and vCore instance and then transferring the configuration data into the new POD and vCore instance. Each POD has one container including a vCore. In this manner, the configuration data from a source POD vCore instance combination is transferred to a destination POD vCore instance combination. Each POD preferably only includes one container and that container includes a single vCore instance, and this arrangement facilitates the use of a network name space that is singular to the vCore instance, rather than bridging multiple vCore instances into a single name space.

Figure 16:
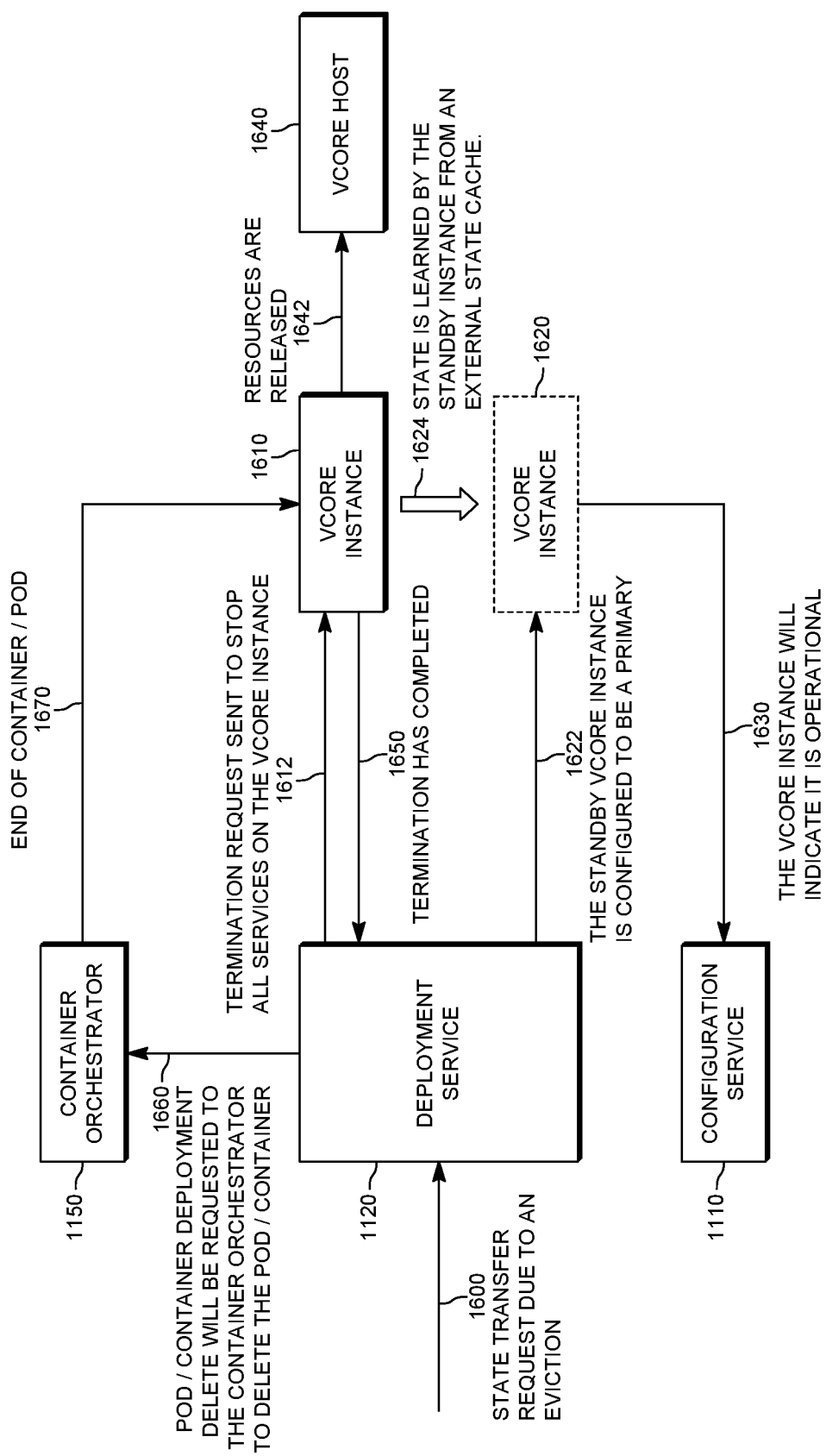
FIG. 16 illustrates a vCore POD/container state transfer.

Referring to FIG. 16, the deployment service 1120 receives a state transfer request due to an eviction 1600. In response, the deployment service 1120 provides a termination request 1612 sent to stop all services on the vCore instance 1610 to be ejected. The deployment service 1120 also configures 1622 a standby vCore instance 1620 to be a primary vCore instance, preferably based upon state information 1624 of the vCore instance 1610 that was terminated. Preferably, the state information 1624 transferred from the vCore instance 1610 to the vCore instance 1620 is obtained from an external state cache, such as an in memory data structure store (e.g., Redis). The vCore instance 1620 provides an indication 1630 to the configuration service 1110 that it is operational. The vCore instance 1610 then releases the resources 1642 that were being used by the terminated vCore instance 1610 on the vCore host 1640. With the vCore instance 1610 having all its services stopped and its resources released, the vCore instance 1610 provides an indication that the termination of the vCore instance 1610 has been completed 1650. With the vCore instance 1610 terminated 1650, the deployment service 1120 provides a request 1660 that the POD and container deployment is to be deleted by the container orchestrator 1150. The container orchestrator 1150 terminates the POD and container 1670 for the vCore instance 1610. Preferably, the group of operations termination request 1612, configuration 1622, state information 1624, and operational indication 1630 are performed in an asynchronous manner with the group of operations resource release 1642, termination request 1650, POD/container deletion request 1660, and termination request 1670.

Figure 17:
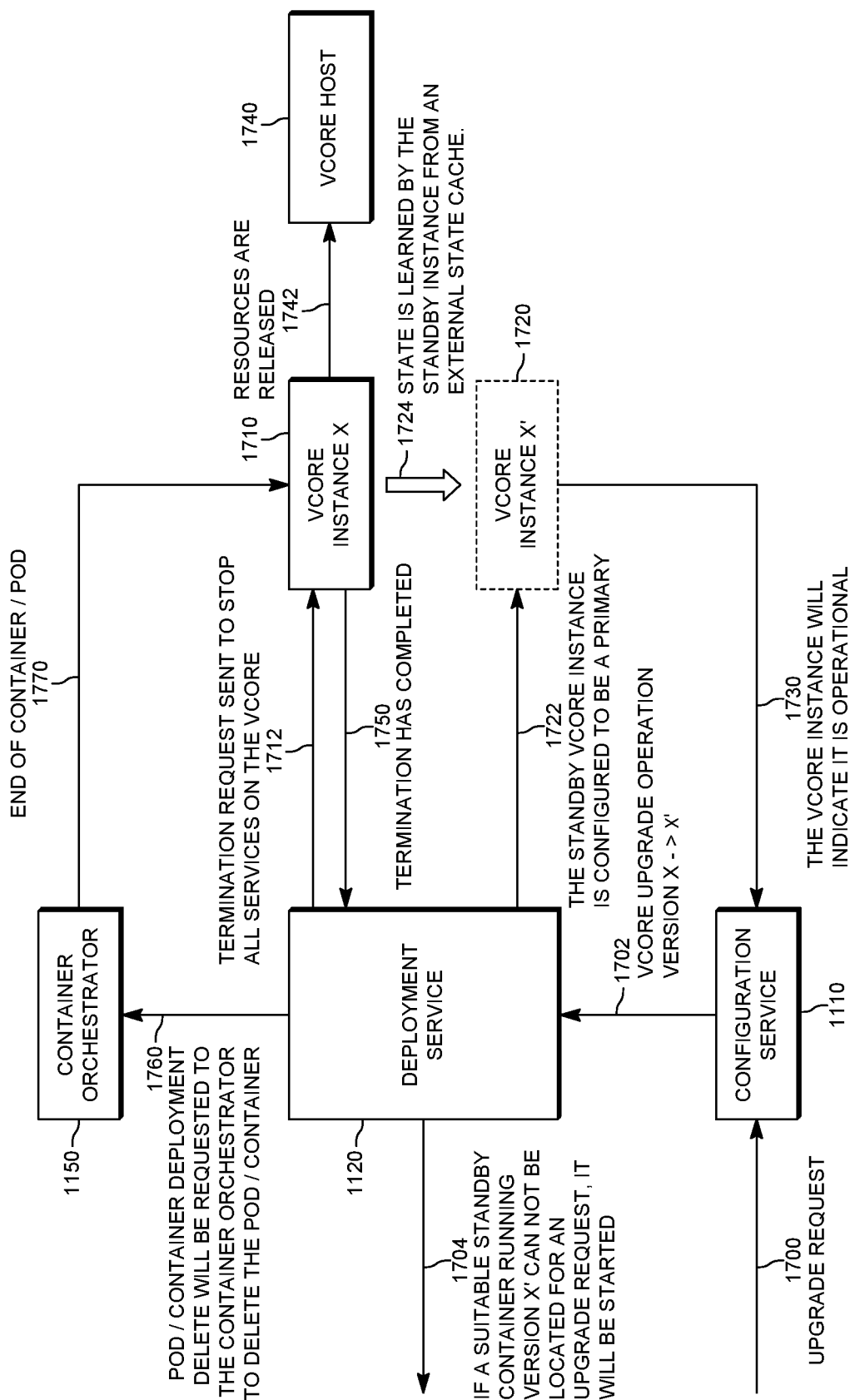
FIG. 17 illustrates a vCore POD/container upgrade.

Referring to FIG. 17, the configuration service 1110 receive an upgrade request 1700 of the POD and vCore instance. The configuration service 1110 provides a vCore instance upgrade operation version x to x' indication 1702 to the deployment service 1120. The deployment service 1120 determines if a suitable standby container running version x' cannot be located, and if not, such a suitable standby container is started 1704, as previously described. With a suitable standby container being available, the deployment service 1120 provides a termination request 1712 sent to stop all services on the vCore instance x 1710 to be ejected. The deployment service 1120 also configures 1722 a standby vCore instance x'1720 to be a primary vCore instance, preferably based upon state information 1724 of the vCore instance x 1710 that was terminated. Preferably, the state information 1724 transferred from the vCore instance x 1710 to the vCore instance x' 1720 is obtained from an external state cache, such as an in memory data structure store (e.g., Redis). The vCore instance x' 1720 provides an indication 1730 to the configuration service 1110 that it is operational. The vCore instance x 1710 then releases the resources 1742 that were being used by the terminated vCore instance x 1710 on the vCore host 1740. With the vCore instance x 1710 having all its services stopped and its resources released, the vCore instance x 1710 provides an indication that the termination of the vCore instance 1710 has been completed 1750. With the vCore instance x 1710 terminated 1750, the deployment service 1120 provides a request 1760 that the POD and container deployment is to be deleted by the container orchestrator 1150. The container orchestrator 1150 terminates the POD and container 1770 for the vCore instance x 1710. Preferably, the group of operations termination request 1712, configuration 1722, state information 1724, and operational indication 1730 are performed in an asynchronous manner with the group of operations resource release 1742, termination request 1750, POD/container deletion request 1760, and termination request 1770.

Figure 18:
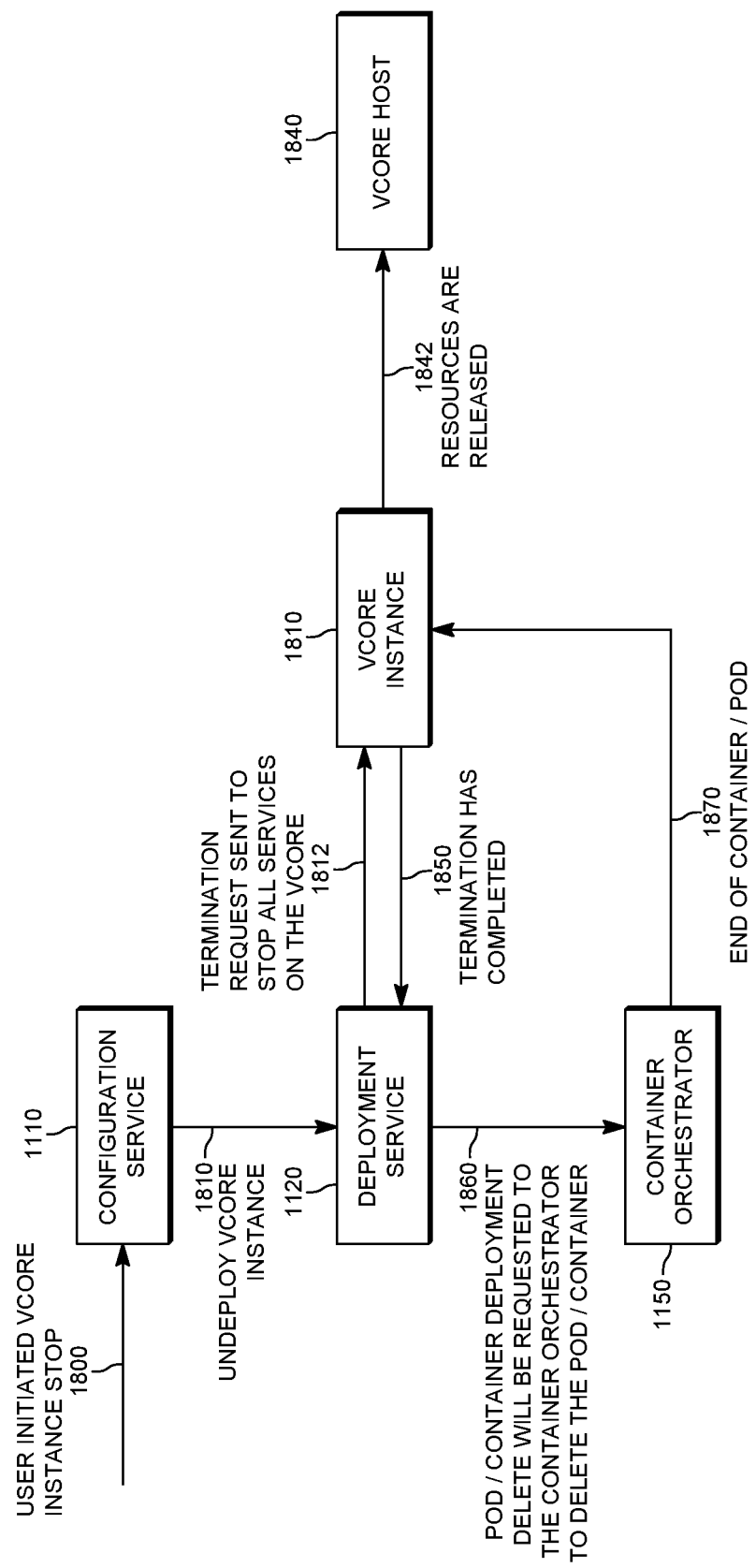
FIG. 18 illustrates a primary vCore instance teardown.

Referring to FIG. 18, the lifecycle manager may teardown a primary (e.g., active) vCore instance. The configuration service 1110 receives a user initiated (or otherwise) request 1800 to stop a vCore instance. The configuration service 1110 sends a request to un-deploy the vCore instance 1810 to the deployment service 1120. The deployment service 1120 provides a termination request 1812 sent to stop all services on the vCore instance 1810 to be ejected. The vCore instance 1810 then releases the resources 1842 that were being used by the terminated vCore instance 1810 on the vCore host 1840. With the vCore instance 1810 having all its services stopped and its resources released, the vCore instance 1810 provides an indication that the termination of the vCore instance 1810 has been completed 1850. With the vCore instance 1810 terminated 1850, the deployment service 1120 provides a request 1860 that the POD and container deployment is to be deleted by the container orchestrator 1150. The container orchestrator 1150 terminates the POD and container 1870 for the vCore instance 1810.

Figure 19:
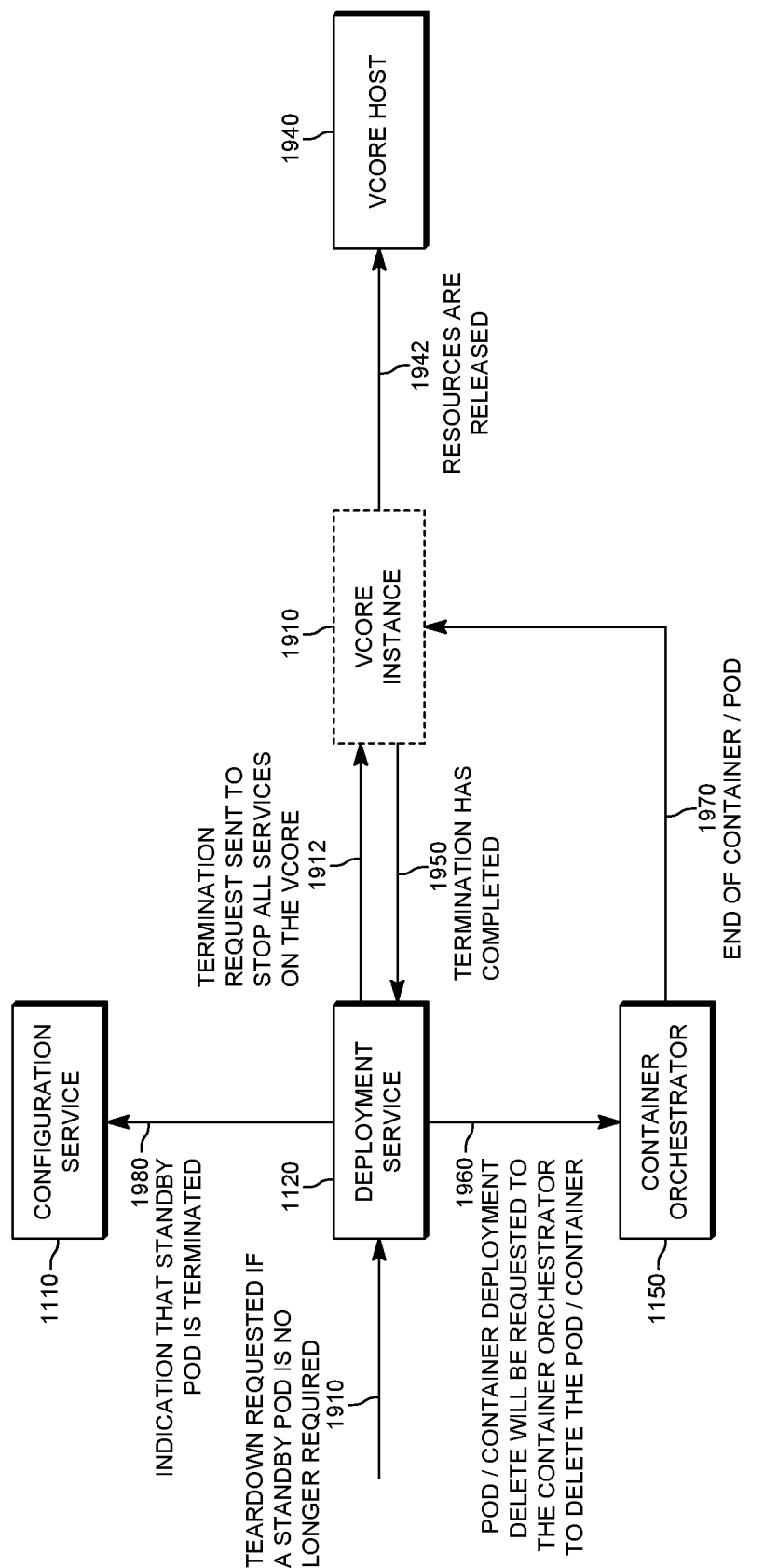
FIG. 19 illustrates a standby vCore instance teardown.

Referring to FIG. 19, the lifecycle manager may teardown a standby (e.g., redundant) vCore instance. The deployment service 1120 receives a teardown request if a standby pod 1910 is no longer required. The deployment service 1120 provides a termination request 1912 sent to stop all services on the vCore instance 1910 to be ejected. The vCore instance 1910 then releases the resources 1942 that were being used by the terminated vCore instance 1910 on the vCore host 1940. With the vCore instance 1910 having all its services stopped and its resources released, the vCore instance 1910 provides an indication that the termination of the vCore instance 1910 has been completed 1950. With the vCore instance 1910 terminated 1950, the deployment service 1120 provides a request 1960 that the POD and container deployment is to be deleted by the container orchestrator 1150. The container orchestrator 1150 terminates the POD and container 1970 for the vCore instance 1910. The deployment service 1120 provides an indication that the standby pod is terminated 1980 to the configuration service 1110.

Figure 20:
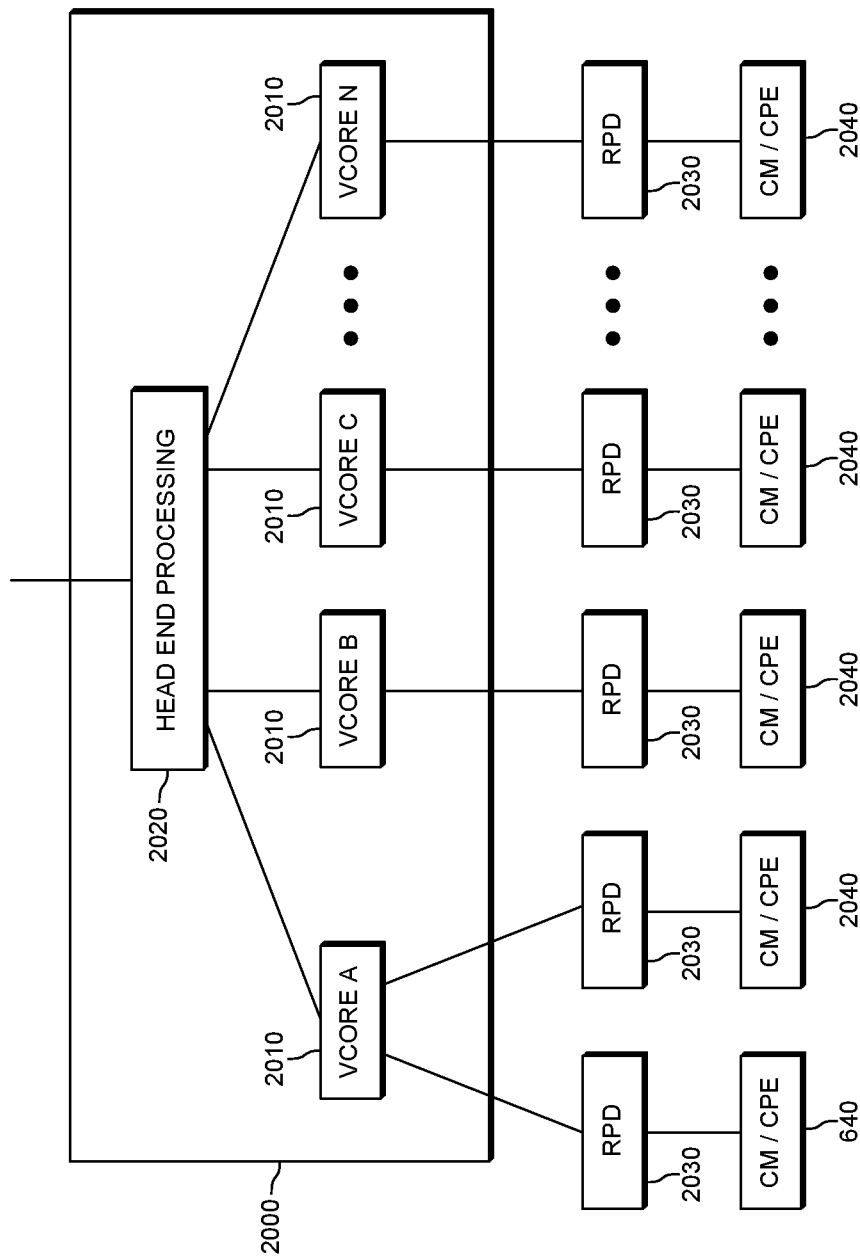
FIG. 20 illustrates a head end with vCores, remote physical devices, and customer devices.
Figure 21:
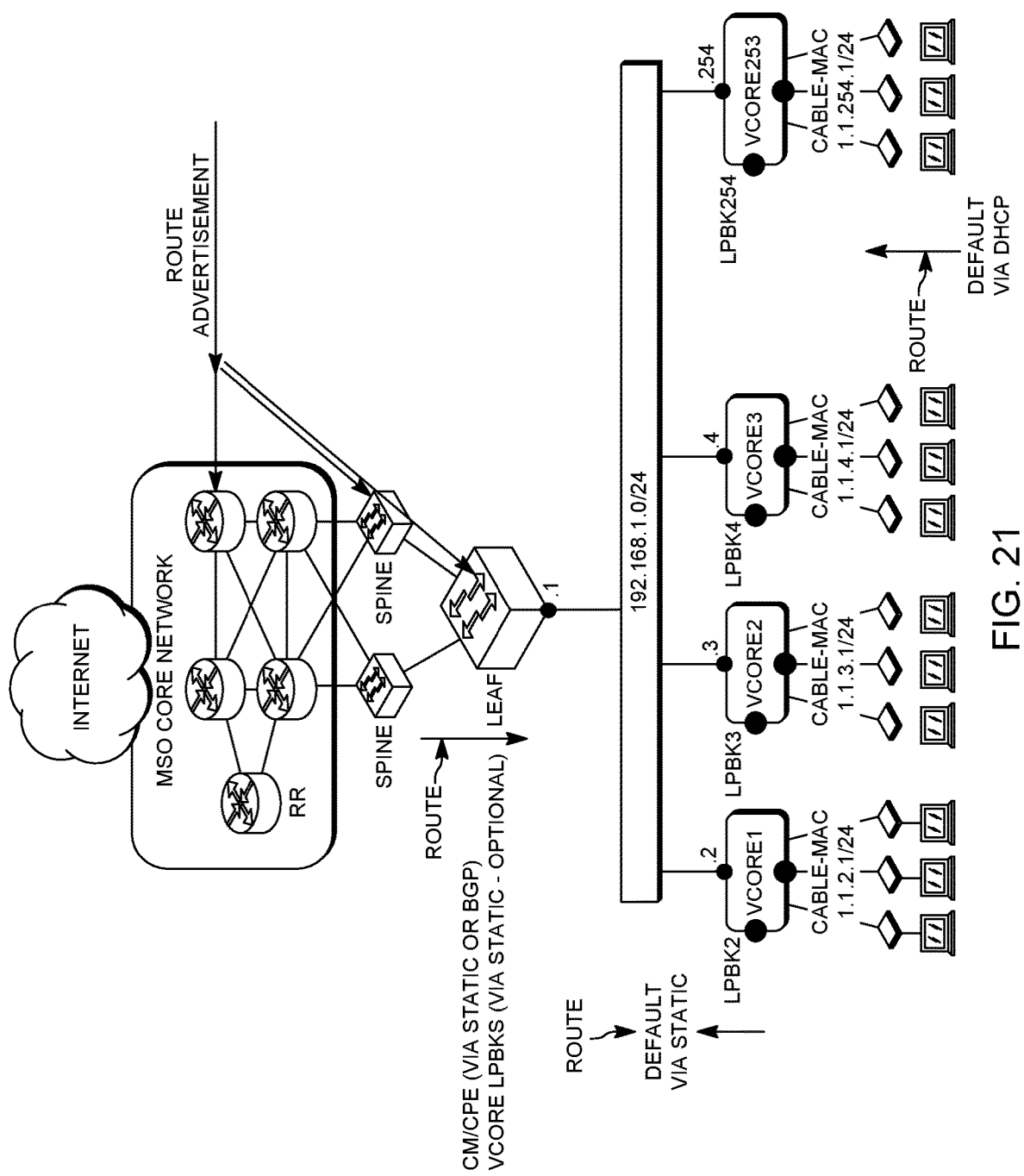
FIG. 21 illustrates another embodiment of a head end with vCores, remote physical devices (not shown), and customer devices.
Figure 22:
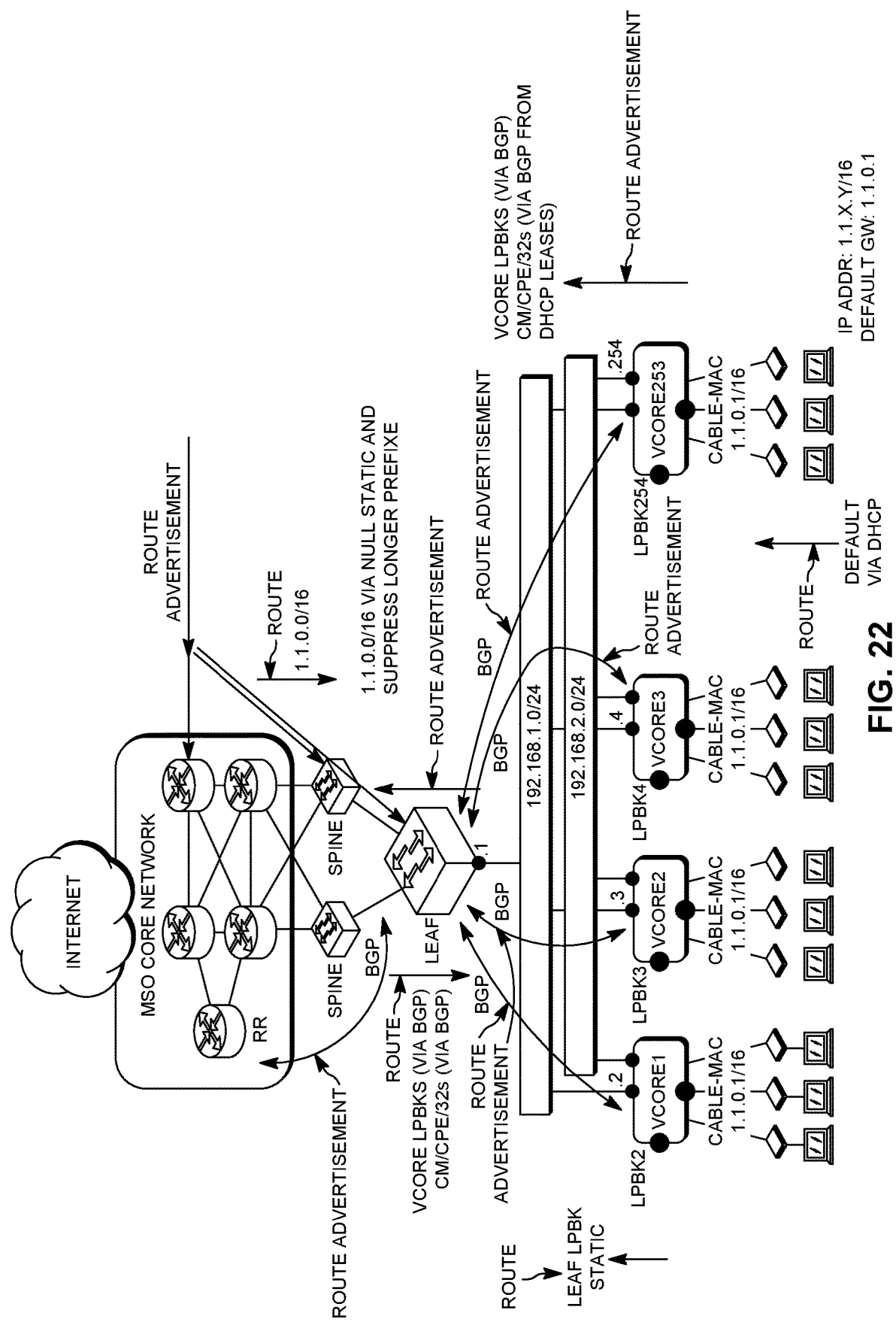
FIG. 22 illustrates another embodiment of a head end with vCores that includes routes maintained in routing tables, remote physical devices (not shown), and customer devices.

Referring to FIG. 20, a cable head end 2000 may include a plurality of vCores 2010 that are running on one or more servers. Each of the vCores 2010 receive data from a head end processing 2020. Each of the vCores 2010 provides data to one or more respective remote physical devices 2030. The remote physical devices 2030 are preferably remotely located from the head end 2000, although they may be included together with the head end 2000, if desired. The remote physical devices 2030, include the Remote PHY (or R-PHY) which relocates the physical layer (PHY) of a traditional Integrated CCAP or a Remote MAC PHY (R-MAC PHY) which relocates both the physical layer (PHY) and the mac layer (MAC) of a traditional Integrated CCAP. Each of the RPDs 2030 provides services to respective cable modems and/or customer premise devices 2040 (generally referred to as customer devices).

A traditional integrated head end often includes a cable bundling technique to manage the groups of customer devices (e.g., cable modems and/or customer premise equipment). The cable bundling technique may be configured to manage multiple MAC domains/service groups using a single logical structure. Each of the MAC domains/service groups includes physical RF ports, and includes a logical structure of IP addresses (one or more IP subnets). In this manner, if there are 100 MAC domains then there are 100 logical structures needed. The 100 logical structures, for example, may be composed of 10 small subnets each that would cover the needs of only one physical structure. The cable bundling includes a single or a limited number of logical structures that acts on behalf of all of the associated physical structures, typically with a large block(s) of addresses. In this manner, the management is simplified for the various MAC domains/service groups by using the cable bundling technique with the CMTS acting as an "IP Interface" for the data traffic. One benefit of such cable bundling is not having to provision a large set of small subnets, nor having to provision a large set of relatively small interfaces, nor the requirement for provisioning excessive IP addresses if they are not necessary, for customers.

It is problematic to effectively apply the cable bundling technique to a distributed architecture because the CMTS is effective separated into different distributed components, where each remote physical device services a single service group or a limited number of service groups. For example, each remote physical device whether R-PHY or R-MAC PHY often services only a few hundred devices. Referring also to FIG. 7, it is similarly problematic to effectively apply the cable bundling technique to a distributed architecture that includes a set of vCores, especially vCores that are Layer 3 devices, which permits segmented routing over an Internet Protocol network. In the vCore related environment, each of the vCores acts generally as an Integrated Converged Cable Access Platform while only serving one remote physical device or a limited number of remote physical devices, and accordingly each vCore provides services for a limited number of customers, such as only a few hundred. In such an architecture, the cable bundling cannot provision a large subnet for all of the MAC domains/service groups, so a separate cable bundling would be required for each of the MAC domains/service groups together with a separate interface using a relatively small address block size. Accordingly, the cable system operator may end up managing hundreds or thousands of vCores, each with a separate interface for a respective cable bundling, resulting in a burdensome management task. Also, cable bundling is limited to a single CMTS operating on a single physical server and is not directly usable across multiple servers having vCores each of which has different ports.

Referring to FIG. 8, a modified technique for the provisioning of vCores should facilitate an efficient provisioning process with an efficient subnet usage, while not being reliant on the use of cable bundling due to its inherent limitations as applied to vCores spanning multiple servers. The RPDs are not expressly illustrated in FIG. 8 but are preferably included in the system (see FIG. 6). By way of example, the modified technique is effective for vCores that support a limited number of remote physical devices, such as 1-3 remote physical devices, typically servicing a respective number of MAC domains. For example, 100 remote physical devices and accordingly 100 service groups, may be mapped to a corresponding 100 vCores. After further consideration it was determined that a single Layer 3 leaf switch, or otherwise a limited number of Layer 3 leaf switches, provides a point where the data traffic for all of the vCores converges. Based upon this consideration, it was determined that provisioning at a leaf switch level of a large subnet for all of the associated vCores that are serviced by a single Layer 3 leaf switch or otherwise a limited number of Layer 3 leaf switches is advantageous.

During the initialization process of a customer device (e.g., a cable modem/customer premise equipment) to the cable system, it makes uses a Dynamic Host Configuration Protocol (DHCP) based protocol request on an Internet Protocol based network to a DHCP server. In response the DHCP server dynamically assigns an IP address and other network configuration parameters to a respective customer device on the network so it can communicate with other IP networks. The other network configuration parameters, may include for example, a default gateway, FTP settings, etc. The vCore acts as a DHCP relay to forward DHCP protocol related data traffic between the DHCP server and the customer device. The DHCP protocol request results in the assignment of an IP address to the requesting customer device.

In combination with the DHCP protocol request to the DHCP server, the vCore also receives the DHCP protocol request while acting as a DHCP relay. The vCore in response to receiving the DHCP protocol request to the DHCP server or otherwise a response to the DHCP protocol request from the DHCP server, the vCore creates a host route that is included in a vCore routing table of the vCore. Also, the vCore preferably changes a source address and GIADDR (a DHCP field that helps with identification of appropriate DHCP scope) DHCP relay packets to a vCore interface different from the cable-mac (e.g., Lpbk or NSI) so the DHCP server returns packets to the right vCore. Typically, GIADDR and source address of the DHCP relayed packets are set to the cable-mac interface address, and using this address in the disclosed embodiments is problematic because the same address needs to be assigned to all vCores in the bundle. The host route preferably defines the route between the customer device and the remote physical device, between the remote physical device and the vCore, and between the vCore and the leaf switch. The routing table maintained in each vCore is a data table that lists the host routes to particular network destinations, such as the respective route between the respective customer device and the vCore and/or Layer 3 switch. Normally the IP address from the DHCP server is provided in trust so the customer device knows the source is legitimate. In this manner, the route or otherwise host route, is injected into the routing table of the vCore for each successful customer device lease. The network protocol preferably being used by the routing table of the vCore is Internet Protocol version 4 (IPv4) compliant. In the case of using Internet Protocol version 6 (IPv6), preferably the routing table uses prefix delegation based routes.

The DHCP is provisioned with a scope of the addresses for the collection of vCores and/or customer devices, where the provisioning is not based directly on any particular vCore nor is the provisioning based directly on any particular customer device.

By way of example, the scope of the DHCP server may be a "/16", which is then also the same scope as the leaf switch being a "/16", where the scope of addresses is assigned to the collection of vCores that are provided services by the leaf switch, as opposed to any particular vCore or any particular customer device. To provide reliable and effective data traffic, the leaf switch should have a leaf routing table so that it may direct data traffic to the appropriate vCore for the respective customer device. The leaf switch using the leaf routing table may provide routing based upon a longest prefix routing technique to route data packets from the leaf switch to the appropriate vCore. Rather than the leaf switch likewise building a routing table directly based upon the DHCP protocol request, which is cumbersome at best, each vCore preferably advertises a host route to the leaf switch for each of the customer devices that it provides services to. The leaf switch in turn, stores the relevant information for the host route in the leaf routing table, in order to route data packets from the leaf switch to the appropriate vCore for the respective customer device. In this manner, the leaf switch maintains routing data indicating which vCore provides services to which customer devices so that data packets can be provided to the appropriate vCore. It will be observed, that each vCore only needs to store host routes for customer devices that it respectively provides services to, and not host routes that other vCores provide services to. Also, when subsequent DHCP protocol requests are made from the same customer device, the routing table in the vCore is updated, and in turn the leaf routing table on the leaf switch is likewise updated based upon the routing table in the vCore.

Updating the routing tables based upon DHCP protocol requests, may also be used in combination with local per vCore cable bundling, if desired.

In particular, the route advertisement may be based upon border gateway protocol, if desired. In particular, the same DHCP scope is preferably provisioned for all vCores connected to one leaf switch (e.g., 1.1.0.1/16). In more particular, the same Ipv4 address (e.g., 1.1.0.1/16) is preferably configured on all vCores on the same leaf switch acting as a vCore relay agent IP address. If desired, the aggregation based upon the leaf routing table may be spread across a plurality of leaf switches. If desired, the aggregation based upon the leaf routing table may be only use a portion of a single leaf switch. If desired, multiple separate aggregations for multiple leaf routing tables may be supported by one or more leaf switches. In particular, a host route (e.g., /32) may be injected in the routing table for each successful lease. In particular, the customer device host routes are preferably advertised via border gateway protocol to the leaf switch which acts as a relay reflector for all the vCores.

By way of example, two border gateway protocol sessions may be established between each vCore and the leaf switch (one for each vCore NSI). The border gateway protocol sessions may be established over the NSI interface/IP address. By way of example, the vCore border gateway protocol of /32 routes may be redistributed into border gateway protocol toward the leaf switch. The cable mac subnets are preferably not redistributed into the border gateway protocol (except for the relay agent IP address if loopback is used). By way of example, the leaf border gateway protocol preferably acts as a relay reflector only for the vCores. The leaf border gateway protocol receives /32 routes from the vCores via the border gateway protocol so it will know how to reach the individual customer devices. The leaf border gateway protocol preferably advertises the cable-mac subnet summary (e.g., 1.1.0.0/16) but not the /32s.

Preferably, the leaf switch maintains the leaf switch table with the host routing for all of its customers, but preferably does not advertise the address of the customers to other upstream devices in the network and/or the Internet. The leaf switch preferably only advertises a summary route that includes the range of addresses in the scope of the DHCP server for the collection of vCores to upstream devices.

Preferably, each vCore has the same respective customer facing subnet for customer devices that it provides services for. The respective customer facing subnet for the customer devices is preferably the same as the scope provided by the DHCP server (e.g., 1.1.0.0/16). As it may be observed, the address space is shared across the vCores downstream from the leaf switch(s). In this manner, a vCore with a substantial number of customer devices will use more address space than a vCore with an insubstantial number of customer devices. Moreover, as it may be observed, there is no need to provision blocks of addresses on a per vCore basis.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A packaging system for deploying computer software, said computer software comprising non-transitory computer readable storage medium having program instructions embodied therein, comprising:
   (a) an archive file containing a plurality of software programs each of which has an associated software program version data;
   (b) said archive file containing a metadata document with metadata software program version data identifying each of said software programs together with said associated software program version data for all of said software programs;
   (c) an extraction process that examines said archive file based upon said metadata document to determine that said plurality of said software programs each of which having said associated software program version data are available within (i) said archive file based upon said metadata software program version data, (ii) a network based delivery service based upon said metadata software program version data, and (iii) at a destination computing environment based upon said metadata software program version data where said archive file is extractable by said packaging system;
   (d) said extraction process determines whether said destination computing environment is suitable for extraction of said archive file;
   (e) said metadata document defines installation dependencies between a plurality of said software programs;
   (f) wherein a first one of said software programs include a hardware driver;
   (g) wherein said extraction process determines whether said destination computing environment includes a set of storage locations defined by said metadata document for said archive file;
   (h) wherein said metadata document defines the order of installation of a plurality of said software programs at said destination computing environment.

2. The packaging system of claim 1 wherein a first one of said software programs include a docker registry and wherein a second one of said software programs includes an operating system distribution.

3. The packaging system of claim 1 wherein said software programs include (a) a docker registry, (b) an operating system distribution, (c) a software driver, and (d) an executable file.

4. The packaging system of claim 1 wherein said extraction process determines whether said destination computing environment includes at least one hardware device defined by said metadata document for said archive file.

5. The packaging system of claim 1 wherein said metadata document defines extraction dependencies between a plurality of said software programs.

6. The packaging system of claim 1 wherein said metadata document defines deployment dependencies between a plurality of said software programs.

7. The packaging system of claim 1 wherein said metadata document defines software programs that need to be installed at said destination computing environment prior to extracting said software programs from said archive file.

8. The packaging system of claim 1 wherein said metadata document defines at least a plurality of different extractions by said extraction process of said archive file, where a first set of said software programs are extracted for a first said destination computing environment and a second set of said software programs are extracted for a second said destination computing environment.

9. The packaging system of claim 1 wherein said archive file includes a plurality of separately compressed files therein that are collectively compressed as said archive file.

10. The packaging system of claim 9 wherein each of said plurality of separately compressed files are encrypted based upon a key.

11. The packaging system of claim 10 wherein said archive is encrypted based upon said key.

12. The packaging system of claim 1 wherein said metadata document references another archive file that includes another metadata document.

13. The packaging system of claim 1 wherein said metadata document references different archive paths for different software programs within said archive document.

\* \* \* \* \*